(12) United States Patent
Gupta et al.

(10) Patent No.: US 7,424,440 B1
(45) Date of Patent: Sep. 9, 2008

(54) SALES OPTIMIZATION

(75) Inventors: Subir E. Gupta, London (GB); Kevin Blackmore, Hants (GB)

(73) Assignee: Accenture Services Limited, London (GB)

(*) Notice: Subject to any disclaimer, the term of this patent is extended or adjusted under 35 U.S.C. 154(b) by 950 days.

(21) Appl. No.: 10/024,526

(22) Filed: Dec. 21, 2001

(51) Int. Cl.
*G06F 17/30* (2006.01)

(52) U.S. Cl. .................................................. 705/10

(58) Field of Classification Search .................. 705/10
See application file for complete search history.

(56) References Cited

U.S. PATENT DOCUMENTS

| | | | |
|---|---|---|---|
| 5,377,095 A | 12/1994 | Maeda et al. | |
| 5,615,109 A | 3/1997 | Eder | |
| 5,712,985 A | 1/1998 | Lee et al. | |
| 5,930,764 A | 7/1999 | Melchione et al. | |
| 5,960,415 A | 9/1999 | Williams | |
| 5,974,396 A | 10/1999 | Anderson et al. | |
| 6,029,139 A * | 2/2000 | Cunningham et al. | 705/10 |
| 6,061,658 A | 5/2000 | Chou et al. | |
| 6,078,901 A | 6/2000 | Ching | |
| 6,094,641 A | 7/2000 | Ouimet et al. | |
| 6,202,070 B1 * | 3/2001 | Nguyen et al. | 707/104.1 |
| 6,910,017 B1 * | 6/2005 | Woo et al. | 705/10 |
| 2002/0059003 A1 * | 5/2002 | Ruth et al. | 700/19 |
| 2002/0123930 A1 * | 9/2002 | Boyd et al. | 705/14 |
| 2002/0165760 A1 * | 11/2002 | Delurgio et al. | 705/10 |
| 2003/0110072 A1 * | 6/2003 | Delurgio et al. | 705/10 |

OTHER PUBLICATIONS

Friend, Scott C. "Welcome to the New World of Merchandising." ProfitLogic, p. 133, Nov. 2001.*
"ShopKo Expands Use of Spotlight Markdown Optimizer." Business Wire, p. 2287, Jan. 15, 2001.*

* cited by examiner

*Primary Examiner*—Susanna M Diaz
(74) *Attorney, Agent, or Firm*—Banner & Witcoff, Ltd.

(57) ABSTRACT

A system and method for forecasting the effects of a marketing decision on future sales by analyzing product sales strategies using archived sales data obtained from database files are disclosed. The database files may be validated so as to insure their integrity. An initial sales profile is used with a defined analysis period to calculate an adjusted weekly sales value and an uplifted sales value is found using a selected uplift percentage. A corresponding profit is calculated based on the uplifted sales value. The method may include risk analysis performed to yield comparative graphical data and to provide for refinement of the previous analysis.

18 Claims, 28 Drawing Sheets

Hierarchy File

| CLANUM | CLADES | SCLNUM | SCLDES | STYNUM | STYDES | OPTNUM | OPTDES | SKUNUM | SKUDES |
|---|---|---|---|---|---|---|---|---|---|
| 507 | JUMPERS | 849 | BASIC ACRYLIC CREW | 55400 | CLASSIC ACRY CREWNK | 55400137 | CLASSIC ACRY CREWNK BLACK | 20310562 | CLASSIC ACRY CREWNK BLACK 10-12 |
| 507 | JUMPERS | 849 | BASIC ACRYLIC CREW | 55400 | CLASSIC ACRY CREWNK | 55400137 | CLASSIC ACRY CREWNK BLACK | 20310563 | CLASSIC ACRY CREWNK BLACK 14-16 |
| 507 | JUMPERS | 849 | BASIC ACRYLIC CREW | 55400 | CLASSIC ACRY CREWNK | 55400137 | CLASSIC ACRY CREWNK BLACK | 20310564 | CLASSIC ACRY CREWNK BLACK 18/20 |
| 507 | JUMPERS | 849 | BASIC ACRYLIC CREW | 55400 | CLASSIC ACRY CREWNK | 55400201 | CLASSIC ACRY CREWNK CREAM | 20550767 | CLASSIC ACRY CREWNK CREAM 10-12 |
| 507 | JUMPERS | 849 | BASIC ACRYLIC CREW | 55400 | CLASSIC ACRY CREWNK | 55400201 | CLASSIC ACRY CREWNK CREAM | 20550768 | CLASSIC ACRY CREWNK CREAM 14-16 |
| 507 | JUMPERS | 849 | BASIC ACRYLIC CREW | 55400 | CLASSIC ACRY CREWNK | 55400201 | CLASSIC ACRY CREWNK CREAM | 20550769 | CLASSIC ACRY CREWNK CREAM 18/20 |
| 507 | JUMPERS | 849 | BASIC ACRYLIC CREW | 55400 | CLASSIC ACRY CREWNK | 55400954 | CLASSIC ACRY CREWNK DRK NAV | 20668082 | CLASSIC ACRY CREWNK DRK NAV 10-12 |
| 507 | JUMPERS | 849 | BASIC ACRYLIC CREW | 55400 | CLASSIC ACRY CREWNK | 55400954 | CLASSIC ACRY CREWNK DRK NAV | 20668083 | CLASSIC ACRY CREWNK DRK NAV 14-16 |

Fig. 7

Actuals File

| | SKUNUM | COST | OSP | SOH | VAT | CONSTK | 1 | 2 | 3 | 4 | 5 | 6... |
|---|---|---|---|---|---|---|---|---|---|---|---|---|
| 4 | 20310562 | 5.8669 | | 15 | 1679 | 17.5 | 250 | 421 | 343 | 203 | 119 | |
| 4 | 20310563 | 5.8669 | | 15 | 1488 | 17.5 | 1068 | 418 | 432 | 233 | 137 | |
| | 20310564 | 5.8669 | | 15 | 1063 | 17.5 | 49 | 195 | 177 | 70 | 41 | |
| | 20550767 | 4.6924 | | 15 | 2143 | 17.5 | 341 | 452 | 393 | 181 | 105 | |
| | 20550768 | 5.8669 | | 15 | 2097 | 17.5 | 695 | 495 | 438 | 203 | 119 | |
| | 20550769 | 5.8669 | | 15 | 1251 | 17.5 | 523 | 153 | 161 | 51 | 30 | |
| | 20668082 | 5.8264 | | 15 | 1977 | 17.5 | 138 | 494 | 403 | 198 | 116 | |
| | 20668083 | 5.8264 | | 15 | 2044 | 17.5 | 76 | 574 | 450 | 244 | 144 | |

Fig. 9

SALES PROFILES

| NAME | BASE CASE | TRICEP BAR | SKIPPING ROPE | AEROBIC WEIGHTS | CAST DISCS | ABDOMONISER | EXERCISE MAT | HAND BARS | FISHING UMBRELLA | FREE WEIGHTS | RUCKSACK | FISHING NET |
|---|---|---|---|---|---|---|---|---|---|---|---|---|
| NUMBER | 1 | 2 | 3 | 4 | 5 | 6 | 7 | 8 | 9 | 10 | 11 | 12 |
| 1 | 100 | 68.0 | 192.0 | 118.0 | 99.0 | 123.0 | 84.0 | 100.0 | 8.0 | 171.0 | 139.0 | 91.0 |
| 2 | 100 | 82.0 | 181.0 | 127.0 | 126.0 | 129.0 | 92.0 | 125.0 | 11.0 | 182.0 | 142.0 | 75.0 |
| 3 | 100 | 103.0 | 197.0 | 125.0 | 115.0 | 169.0 | 66.0 | 117.0 | 29.0 | 204.0 | 142.0 | 89.0 |
| 4 | 100 | 80.0 | 191.0 | 118.0 | 129.0 | 126.0 | 67.0 | 133.0 | 25.0 | 216.0 | 163.0 | 77.0 |
| 5 | 100 | 78.0 | 222.0 | 111.0 | 99.0 | 144.0 | 61.0 | 115.0 | 27.0 | 221.0 | 139.0 | 93.0 |
| 6 | 100 | 78.0 | 185.0 | 128.0 | 122.0 | 125.0 | 55.0 | 135.0 | 22.0 | 201.0 | 103.0 | 69.0 |
| 7 | 100 | 58.0 | 174.0 | 113.0 | 127.0 | 145.0 | 102.0 | 123.0 | 18.0 | 207.0 | 77.0 | 67.0 |
| 8 | 100 | 76.0 | 138.0 | 105.0 | 108.0 | 120.0 | 126.0 | 118.0 | 31.0 | 177.0 | 104.0 | 81.0 |
| 9 | 100 | 69.0 | 148.0 | 134.0 | 116.0 | 151.0 | 142.0 | 125.0 | 30.0 | 210.0 | 82.0 | 78.0 |
| 10 | 100 | 90.0 | 125.0 | 143.0 | 90.0 | 140.0 | 134.0 | 134.0 | 46.0 | 181.0 | 103.0 | 60.0 |
| 11 | 100 | 79.0 | 127.0 | 137.0 | 82.0 | 121.0 | 105.0 | 132.0 | 93.0 | 176.0 | 93.0 | 54.0 |
| 12 | 100 | 78.0 | 151.0 | 126.0 | 135.0 | 160.0 | 83.0 | 94.0 | 61.0 | 190.0 | 99.0 | 35.0 |
| 13 | 100 | 70.0 | 127.0 | 94.0 | 98.0 | 177.0 | 77.0 | 128.0 | 75.0 | 189.0 | 82.0 | 65.0 |
| 14 | 100 | 77.0 | 190.0 | 121.0 | 84.0 | 221.0 | 89.0 | 130.0 | 80.0 | 208.0 | 119.0 | 54.0 |
| 15 | 100 | 67.0 | 157.0 | 102.0 | 85.0 | 244.0 | 70.0 | 160.0 | 84.0 | 228.0 | 121.0 | 72.0 |
| 16 | 100 | 82.0 | 183.0 | 134.0 | 122.0 | 318.0 | 102.0 | 134.0 | 94.0 | 214.0 | 135.0 | 80.0 |
| 17 | 100 | 89.0 | 196.0 | 143.0 | 145.0 | 394.0 | 109.0 | 144.0 | 108.0 | | 160.0 | 94.0 |
| 18 | 100 | 94.0 | 208.0 | 152.0 | 176.0 | 473.0 | 116.0 | 152.0 | 124.0 | 244.0 | 188.0 | 111.0 |
| 19 | 100 | 96.0 | 213.0 | 157.0 | 195.0 | 537.0 | 119.0 | 157.0 | 149.0 | 250.0 | 204.0 | 121.0 |
| 20 | 100 | 94.0 | 209.0 | 153.0 | 213.00 | 554.0 | 117.0 | 153.0 | 153.0 | 246.0 | 214.0 | 127.0 |
| 21 | 100 | 101.0 | 223.0 | 163.0 | 255.0 | 636.0 | 125.0 | 165.0 | 192.0 | 263.0 | 253.0 | 151.0 |
| 22 | 100 | 84.0 | 187.0 | 136.0 | 256.0 | 648.0 | 105.0 | 138.0 | 250.0 | 220.0 | 230.0 | 136.0 |
| 23 | 100 | 50.0 | 111.0 | 80.0 | 87.0 | 264.0 | 61.0 | 81.0 | 182.0 | 130.0 | 75.0 | 43.0 |
| 24 | 100 | 70.0 | 154.0 | 113.0 | 91.0 | 207.0 | 87.0 | 114.0 | 165.0 | 181.0 | 87.0 | 51.0 |
| 25 | 100 | 77.0 | 168.0 | 123.0 | 88.0 | 173.0 | 94.0 | 124.0 | 138.0 | 197.0 | 91.0 | 54.0 |
| 26 | 100 | 0.0 | 0.0 | 0.0 | 0.0 | 0.0 | 0.0 | 0.0 | 0.0 | 0.0 | 0.0 | 0.0 |
| 27 | 100 | 0.0 | 0.0 | 0.0 | 0.0 | 0.0 | 0.0 | 0.0 | 0.0 | 0.0 | 0.0 | 0.0 |
| 28 | 100 | 0.0 | 0.0 | 0.0 | 0.0 | 0.0 | 0.0 | 0.0 | 0.0 | 0.0 | 0.0 | 0.0 |

Fig. 13

| SELECT SKUs | | | | | | | | |
|---|---|---|---|---|---|---|---|---|
| CLASS NUMBER | CLASS DESCRIPTION | SUB CLASS NUMBER | SUB CLASS DESCRIPTION | STYLE NUMBER | STYLE DESCRIPTION | OPTION NUMBER | OPTION DESCRIPTION | SKU NUMBER | SKU DESCRIPTION |
| 514 | FOOD GIFTS | 214 | COOK SETS | 351000 | SIZZLER SE | 3510004646 | SIZZLER SET: NO | 20988272 | SIZZLER SET: NO COL:NO SIZE |
| 514 | FOOD GIFTS | 214 | COOK SETS | 351002 | BOOK SETS | 3510027467 | BOOK SETS:INDIA | 21019915 | BOOK SETS:INDIAN:ONE SIZE |
| 514 | FOOD GIFTS | 214 | COOK SETS | 351002 | BOOK SETS | 3510027468 | BOOK SETS:FREN | 21019914 | BOOK SETS:FRENCH:ONE SIZE |
| 514 | FOODIGIFTS | 214 | COOK SETS | 351002 | BOOK SETS | 3510027476 | BOOK SETS:ITALI | 21019913 | BOOK SETS:ITALIAN:ONE SIZE |
| 514 | FOOD GIFTS | 214 | COOK SETS | 351005 | TORTILLA W | 3510054646 | TORTILLA WARM | 20998781 | TORTILLA WARMER:NO COL:ONE SIZE |
| 514 | FOOD GIFTS | 214 | COOK SETS | 351006 | BAMBOO S | 3510064646 | BAMBOO SATAY | 20998937 | BAMBOO SATAY SET:NO COL:ONE SIZE |
| 514 | FOOD GIFTS | 214 | COOK SETS | 351007 | CHINESE DI | 3510074646 | CHINESE DIP SET | 20998932 | CHINESE DIP SET:NO COL:ONE SIZE |
| 514 | FOOD GIFTS | 214 | COOK SETS | 351009 | NIAAN SET | 3510094646 | NAAN SET:NO CO | 20998938 | NAAN SET:NO COL:ONE SIZE |
| 514 | FOOD GIFTS | 214 | COOK SETS | 351012 | THAI TRAY | 3510124646 | THAI TRAY:NO C | 21003306 | THAI TRAY:NO COL:ONE SIZE |
| 514 | FOOD GIFTS | 214 | COOK SETS | 351013 | RICE STEA | 3510134646 | RICE STEAMER:N | 20998934 | RICE STEAMER:NO COL:ONE SIZE |
| 514 | FOOD GIFTS | 214 | COOK SETS | 351014 | GARLIC BO | 3510144646 | GARLIC BOOK SE | 21003302 | GARLIC BOOK SET:NO COL:ONE SIZE |
| 514 | FOOD GIFTS | 214 | COOK SETS | 351154 | CIABATTA | 3511549999 | CIABATTA SET:N | 20875492 | CIABATTA SET:NO COLOUR:NO SIZE |
| 514 | FOOD GIFTS | 610 | CANT COOK | 351100 | CHILLI HOT | 3511004646 | CHILLI HOT SAU | 20998947 | CHILLI HOT SAUCE: NO COL:ONE SIZE |
| 514 | FOOD GIFTS | 610 | CANT COOK | 351101 | DOCTOR SC | 3514054646 | DOCTOR SCARY | 20998948 | DOCTOR SCARY PICKLES:NO COL:ONE SIZE |
| 514 | FOOD GIFTS | 610 | CANT COOK | 351102 | BEER SOUF | 3511024646 | BEER SOUP:NO C | 20998949 | BEER SOUP:NO COL:ONE SIZE |
| 514 | FOOD GIFTS | 610 | CANT COOK | 351103 | FRIDAY NIG | 3511034646 | FRIDAY NIGHT C | 20998951 | FRIDAY NIGHT CURRY:NO COL:ONE SIZE |
| 514 | FOOD GIFTS | 610 | CANT COOK | 351104 | KILLER CHIL | 3541014646 | KILLER CHILLI:N | 20998952 | KILLER CHILLI:NO COL:ONE SIZE |
| 514 | FOOD GIFTS | 610 | CANT COOK | 351105 | COWBOY BI | 3511054646 | COWBOY BEAN S | 20998960 | COWBOY BEAN SOUP:NO COL:ONE SIZE |
| 514 | FOOD GIFTS | 610 | CANT COOK | 351106 | WINE PIZZA | 3511064646 | WINE PIZZA:NO | 20998961 | WINE PIZZA:NO COL:ONE SIZE |
| 514 | FOOD GIFTS | 610 | CANT COOK | 351107 | MEGA COFI | 3511144646 | MEGA COFFEE:N | 20998962 | MEGA COFFEE:NO COL:ONE SIZE |
| 514 | FOOD GIFTS | 610 | CANT COOK | 351108 | DRINK MIX | 3511084646 | DRINK MIX:NO C | 20998963 | DRINK MIX:NO COL:ONE SIZE |
| 514 | FOOD GIFTS | 610 | CANT COOK | 351109 | DRINK MIX | 3540254646 | DRINK MIX:B MA | 21042549 | DRINK MIX:B MARY:ONE SIZE |
| 514 | FOOD GIFTS | 610 | CANT COOK | 351110 | HOT TOMA | 3511104646 | HOT TOMATOE | 20998965 | HOT TOMATOE SAUCE:no COL:ONE SIZE |
| 514 | FOOD GIFTS | 610 | CANT COOK | 351111 | CHILLIBEEF | 3511114646 | CHILLI BEER & N | 21009048 | CHILLI BEER & NUTS:NO COL:ONE SIZE |
| 514 | FOOD GIFTS | 610 | CANT COOK | 351112 | BREAKFAS | 3557104646 | BREAKFAST CER | 21020258 | BREAKFAST CEREAL:NO COL:ONE SIZE |
| 514 | FOOD GIFTS | 610 | CANT COOK | 351113 | SAUCE-CHI | 3519174646 | SAUCE CHICKEN: | 21020260 | SAUCE CHICKEN:NO COL:ONE SIZE |
| 514 | FOOD GIFTS | 610 | CANT COOK | 351114 | SAUCE-BUF | 3545024646 | SAUCE BURGER: | 21020262 | SAUCE BURGER:NO COL:ONE SIZE |
| 514 | FOOD GIFTS | 610 | CANT COOK | 351258 | CHILLI HOT | 3512589999 | CHILLI HOT SAU | 20875546 | CHILLI HOT SAUCE:NO COL:ONE SIZE |
| 514 | FOOD GIFTS | 611 | UMBRIA | 351201 | SALAD DRE | 3512014646 | SALAD DRESSIN | 20998966 | SALAD DRESSING KIT:NO COL:ONE SIZE |
| 514 | FOOD GIFTS | 611 | UMBRIA | 351202 | OIL & VINEG | 3512024646 | OIL & VINEGAR | 20998967 | OIL & VINEGAR RACK:NO COL:ONE SIZE |
| 514 | FOOD GIFTS | 611 | UMBRIA | 351203 | OLIVES & DI | 3512034646 | OLIVES & DISH S | 20996968 | OLIVES & DISH SET:NO COL:ONE SIZE |
| 514 | FOOD GIFTS | 611 | UMBRIA | 351204 | ITALIAN BA | 3512044646 | ITALIAN BASKET: | 20996969 | ITALIAN BASKET:NO COL:ONE SIZE |
| 514 | FOOD GIFTS | 611 | UMBRIA | 351205 | SPAGHETT | 3512054646 | SPAGHETTI JAR: | 20988970 | SPAGHETTI JAR:NO COL:ONE SIZE |
| 514 | FOOD GIFTS | 611 | UMBRIA | 351206 | LAYERED P | 3512067375 | LAYERED PULSES | 21000157 | LAYERED PULSES:TALL:ONE SIZE |

Fig. 14

| ANALYSIS FUNCTIONS | SORT OPTIONS | LEVEL UP | BACK | | BASE ANALYSIS | | | | START WEEK 19 | END WEEK 24 | PROFILES | | OPTION 1 | | OPTION 2 | | OPTION 3 | |
|---|---|---|---|---|---|---|---|---|---|---|---|---|---|---|---|---|---|---|
| | | LEVEL DOWN | | | TAKEN FROM HIERARCHY | | | | | | | | PROFILE | RE-BUY | PROFILE | RE-BUY | PROFILE | RE-BUY |
| SKU NUMBER | SKU DESCRIPTION | | | NET COST (UNIT) | OSP (UNIT) | VAT (%) | S.O.H. (UNITS) | SALES ADJUSTED ACTUALS | | CONTRACTED STOCK (INC SOO) | COMMIT-MENT | SALES | | | | | | |
| 20988272 | SIZZLER SET: NO COL-NO SIZE | | | 6.32 | 12.00 | 14.0 | 2060 | 1080.4 | | 932 | | 11 | | | | | | |
| 21019915 | BOOK SETS:INDIAN:ONE SIZE | | | 3.77 | 7.00 | 0.0 | 6738 | 282.9 | | 297 | | 11 | | | | | | |
| 21019914 | BOOK SETS:FRENCH:ONE SIZE | | | 3.77 | 7.00 | 0.0 | 3079 | 212.8 | | 205 | | 11 | | | | | | |
| 21019913 | BOOK SETS:ITALIAN:ONE SIZE | | | 3.77 | 7.00 | 0.0 | 3939 | 327.6 | | 320 | | 11 | | | | | | |
| 20998781 | TORTILLA WARMER:NO COL:ONE SIZE | | | 7.30 | 14.00 | 11.0 | 1029 | 292.2 | | 278 | | 11 | | | | | | |
| 20998937 | BAMBOO SATAY SET:NO COL:ONE SIZE | | | 4.12 | 8.00 | 9.2 | 1019 | 156.2 | | 186 | | 11 | | | | | | |
| 20998932 | CHINESE DIP SET:NO COL:ONE SIZE | | | 6.02 | 10.00 | 17.5 | 2335 | 266.5 | | 348 | | 11 | | | | | | |
| 20998838 | NAAN SET:NO COL:ONE SIZE | | | 6.27 | 12.00 | 10.0 | 736 | 72.6 | | 74 | | 11 | | | | | | |
| 21003306 | THAI TRAY:NO COL:ONE SIZE | | | 7.55 | 15.00 | 9.1 | 1359 | 204.8 | | 206 | | 11 | | | | | | |
| 20998934 | RICE STEAMER:NO COL:ONE SIZE | | | 6.86 | 12.00 | 15.0 | 1016 | 323.6 | | 379 | | 11 | | | | | | |
| 21003302 | GARLIC BOOK SET:NO COL:ONE SIZE | | | 4.82 | 9.00 | 0.0 | 3103 | 434.7 | | 394 | | 11 | | | | | | |
| 20875492 | CIABATTA SET:NO COLOUR:NO SIZE | | | 6.45 | 12.00 | 0.0 | 170 | 8.1 | | 0 | | 11 | | | | | | |

Fig. 15

| OPTIONS | LEVEL UP | BACK | WEEKLY SALE | | | WEEK 14 | WEEK 15 | WEEK 16 | WEEK 17 | WEEK 18 | WEEK 19 | WEEK 20 | WEEK 21 | WEEK 22 | WEEK 23 | WEEK 24 |
|---|---|---|---|---|---|---|---|---|---|---|---|---|---|---|---|---|
| | LEVEL DOWN | | | | | | | | | | | | | | | |
| SKU NUMBER | SKU DESCRIPTION | | SALES PROFILE | PROFILE | RE-BUY | | | | | | | | | | | |
| 20988272 | SIZZLER SET: NO COL-NO S | | 11 | 1 | 3500 | | | | | | 1262 | 1405 | 1605 | 1802 | 1527 | 136 |
| 21019915 | BOOK SETS:INDIAN:ONE SIZ | | 11 | 5 | | | | | | | 568 | 581 | 390 | 438 | 1189 | 93 |
| 21019914 | BOOK SETS:FRENCH:ONE SI | | 11 | 5 | | | | | | | 460 | 470 | 316 | 355 | 962 | 75 |
| 21019913 | BOOK SETS:ITALIAN:ONE SI | | 11 | 5 | | | | | | | 708 | 724 | 487 | 547 | 1481 | 116 |
| 20998781 | TORTILLA WARMER:NO CO | | 11 | 1 | | | | | | | 341 | 380 | 434 | 487 | 413 | 37 |
| 20998937 | BAMBOO SATAY SET:NO CO | | 11 | 1 | | | | | | | 182 | 203 | 232 | 261 | 221 | 20 |
| 20998932 | CHINESE DIP SET:NO COL:O | | 11 | 1 | | | | | | | 311 | 347 | 396 | 445 | 377 | 34 |
| 20998838 | NAAN SET:NO COL:ONE SIZ | | 11 | 1 | | | | | | | 85 | 94 | 108 | 121 | 103 | 9 |
| 21003306 | THAI TRAY:NO COL:ONE SI | | 11 | 1 | | | | | | | 239 | 266 | 304 | 234 | 289 | 26 |
| 20998934 | RICE STEAMER:NO COL:ON | | 11 | 1 | 1500 | | | | | | 378 | 421 | 481 | 540 | 457 | 41 |
| 21003302 | GARLIC BOOK SET:NO COL | | 11 | 1 | | | | | | | 508 | 565 | 646 | 725 | 614 | 55 |
| 20875492 | CIABATTA SET:NO COLOUR | | 11 | 1 | | | | | | | 9 | 10 | 12 | 13 | 11 | 1 |

Fig. 16

SALES PROFILES — 470

| NAME NUMBER | TEST 1 | TRICEP BAR 2 | SKIPPING ROPE 3 | AEROBIC WEIGHTS 4 | CAST DISCS 5 | ABDOMONISER 6 | EXERCISE MAT 7 | HAND BARS 8 | FISHING UMBRELLA 9 | FREE WEIGHTS 10 | RUCKSACK 11 | FISHING NET 12 |
|---|---|---|---|---|---|---|---|---|---|---|---|---|
| 1 | 0 | 0.0 | 0.0 | 0.0 | 0.0 | 0.0 | 0.0 | 0.0 | 0.0 | 0.0 | 0.0 | 0.0 |
| 2 | 0 | 0.0 | 0.0 | 0.0 | 0.0 | 0.0 | 0.0 | 0.0 | 0.0 | 0.0 | 0.0 | 0.0 |
| 3 | 0 | 0.0 | 0.0 | 0.0 | 0.0 | 0.0 | 0.0 | 0.0 | 0.0 | 0.0 | 0.0 | 0.0 |
| 4 | 0 | 0.0 | 0.0 | 0.0 | 0.0 | 0.0 | 0.0 | 0.0 | 0.0 | 0.0 | 0.0 | 0.0 |
| 5 | 0 | 0.0 | 0.0 | 0.0 | 0.0 | 0.0 | 0.0 | 0.0 | 0.0 | 0.0 | 0.0 | 0.0 |
| 6 | 0 | 0.0 | 0.0 | 0.0 | 0.0 | 0.0 | 0.0 | 0.0 | 0.0 | 0.0 | 0.0 | 0.0 |
| 7 | 0 | 0.0 | 0.0 | 0.0 | 0.0 | 0.0 | 0.0 | 0.0 | 0.0 | 0.0 | 0.0 | 0.0 |
| 8 | 0 | 0.0 | 0.0 | 0.0 | 0.0 | 0.0 | 0.0 | 0.0 | 0.0 | 0.0 | 0.0 | 0.0 |
| 9 | 0 | 0.0 | 0.0 | 0.0 | 0.0 | 0.0 | 0.0 | 0.0 | 0.0 | 0.0 | 0.0 | 0.0 |
| 10 | 0 | 0.0 | 0.0 | 0.0 | 0.0 | 0.0 | 0.0 | 0.0 | 0.0 | 0.0 | 0.0 | 0.0 |
| 11 | 0 | 0.0 | 0.0 | 0.0 | 0.0 | 0.0 | 0.0 | 0.0 | 0.0 | 0.0 | 0.0 | 0.0 |
| 12 | 0 | 0.0 | 0.0 | 0.0 | 0.0 | 0.0 | 0.0 | 0.0 | 0.0 | 0.0 | 0.0 | 0.0 |
| 13 | 0 | 0.0 | 0.0 | 0.0 | 0.0 | 0.0 | 0.0 | 0.0 | 0.0 | 0.0 | 0.0 | 0.0 |
| 14 | 0 | 0.0 | 0.0 | 0.0 | 0.0 | 0.0 | 0.0 | 0.0 | 0.0 | 0.0 | 0.0 | 0.0 |
| 15 | 0 | 0.0 | 0.0 | 0.0 | 0.0 | 0.0 | 0.0 | 0.0 | 0.0 | 0.0 | 0.0 | 0.0 |
| 16 | 0 | 0.0 | 0.0 | 0.0 | 0.0 | 0.0 | 0.0 | 0.0 | 0.0 | 0.0 | 0.0 | 0.0 |
| 17 | 0 | 0.0 | 0.0 | 0.0 | 0.0 | 0.0 | 0.0 | 0.0 | 0.0 | 0.0 | 0.0 | 0.0 |
| 18 | 0 | 0.0 | 0.0 | 0.0 | 0.0 | 0.0 | 0.0 | 0.0 | 0.0 | 0.0 | 0.0 | 0.0 |
| 19 | 0 | 0.0 | 0.0 | 0.0 | 0.0 | 0.0 | 0.0 | 430.0 | 700.0 | 0.0 | 0.0 | 0.0 |
| 20 | 0 | 0.0 | 0.0 | 0.0 | 1610.0 | 0.0 | 0.0 | 0.0 | 0.0 | 0.0 | 270.0 | 760.0 |
| 21 | 0 | 0.0 | 0.0 | 0.0 | 0.0 | 0.0 | 0.0 | 0.0 | 0.0 | 0.0 | 0.0 | 0.0 |
| 22 | 0 | 0.0 | 0.0 | 0.0 | 0.0 | 0.0 | 0.0 | 0.0 | 0.0 | 0.0 | 0.0 | 0.0 |
| 23 | 0 | 430.0 | 0.0 | 0.0 | 0.0 | 0.0 | 0.0 | 0.0 | 0.0 | 0.0 | 0.0 | 0.0 |
| 24 | 0 | 0.0 | 0.0 | 0.0 | 0.0 | 0.0 | 0.0 | 0.0 | 0.0 | 0.0 | 0.0 | 0.0 |
| 25 | 0 | 0.0 | 0.0 | 0.0 | 0.0 | 0.0 | 0.0 | 0.0 | 0.0 | 0.0 | 0.0 | 0.0 |
| 26 | 0 | 0.0 | 0.0 | 0.0 | 0.0 | 0.0 | 0.0 | 0.0 | 0.0 | 0.0 | 0.0 | 0.0 |
| 27 | 0 | 0.0 | 0.0 | 0.0 | 0.0 | 0.0 | 0.0 | 0.0 | 0.0 | 0.0 | 0.0 | 0.0 |
| 28 | 0 | 0.0 | 0.0 | 0.0 | 0.0 | 0.0 | 0.0 | 0.0 | 0.0 | 0.0 | 0.0 | 0.0 |

Fig. 17

| NAME NUMBER FIXED COST | FULL PRICE 1 | | | PROMOTION 2 | | | CLEARANCE 3 | | | REPRICE 4 | | |
|---|---|---|---|---|---|---|---|---|---|---|---|---|
| TYPE | PRICE (-VE) | SALES (+VE) | SCM? | PRICE (-VE) | SALES (+VE) | SCM? | PRICE (-VE) | SALES (+VE) | SCM? | PRICE (-VE) | SALES (+VE) | SCM? |
| 1 | 0 | 0 | | 0 | 0 | | 0 | 0 | | | | |
| 2 | 0 | 0 | | 0 | 0 | | 0 | 0 | | | | |
| 3 | 0 | 0 | | 0 | 0 | | 0 | 0 | | | | |
| 4 | 0 | 0 | | 0 | 0 | | 0 | 0 | | | | |
| 5 | 0 | 0 | | 5 | 10 | | 0 | 0 | | | | |
| 6 | 0 | 0 | | 0 | 0 | | 0 | 0 | | | | |
| 7 | 0 | 0 | | 10 | 13 | | 0 | 0 | | | | |
| 8 | 0 | 0 | | 0 | 0 | | 0 | 0 | | | | |
| 9 | 0 | 0 | | 15 | 15 | | 0 | 0 | | | | |
| 10 | 0 | 0 | | 0 | 0 | | 0 | 0 | | | | |
| 11 | 0 | 0 | | 20 | 18 | | 0 | 0 | | | | |
| 12 | 0 | 0 | | 0 | 0 | | 0 | 0 | | | | |
| 13 | 0 | 0 | | 0 | 0 | | 0 | 0 | | | | |
| 14 | 0 | 0 | | 0 | 0 | | 0 | 0 | | | | |
| 15 | 0 | 0 | | 0 | 0 | | 0 | 0 | | | | |
| 16 | 0 | 0 | | 0 | 0 | | 0 | 0 | | | | |
| 17 | 0 | 0 | | 0 | 0 | | 0 | 0 | | | | |
| 18 | 0 | 0 | | 0 | 0 | Y | 0 | 0 | | | | |
| 19 | 0 | 0 | | 20 | 18 | | 50 | 50 | | | | |
| 20 | 0 | 0 | | 20 | 18 | | 50 | 50 | | | | |
| 21 | 0 | 0 | | 0 | 0 | | 50 | 50 | | | | |
| 22 | 0 | 0 | | 0 | 0 | | 50 | 50 | | | | |
| 23 | 0 | 0 | | 0 | 0 | | 50 | 50 | | | | |
| 24 | 0 | 0 | | 0 | 0 | | 0 | 0 | | | | |
| 25 | 0 | 0 | | 0 | 0 | | 0 | 0 | | | | |
| 26 | 0 | 0 | | 0 | 0 | | 0 | 0 | | | | |
| 27 | 0 | 0 | | 0 | 0 | | 0 | 0 | | | | |
| 28 | 0 | 0 | | 0 | 0 | | 0 | 0 | | | | |

480 / MARKDOWN PROFILE

Fig. 18

RISK ANALYSIS

| ANALYSIS FUNCTIONS | SORT OPTIONS | LEVEL UP / LEVEL DOWN | BACK | | | | | | | | SORTED AS IMPORTED | | | | ACTUAL SALES INC VAT | PROFIT POST MARKDOWN | WORST CASE UNITS SOLD |
|---|---|---|---|---|---|---|---|---|---|---|---|---|---|---|---|---|---|
| | | | | PROFILES | | OPTION 1 | | OPTION 2 | | OPTION 3 | | SALES RISK | | MARKDOWN RISK | | | |
| SKU NUMBER | SKU DESCRIPTION | | | COMMIT -MENT | SALES | PROFILE | RE-BUY | PROFILE | RE-BUY | PROFILE | RE-BUY | WORST (-%) | BEST (+%) | WORST (-%) | BEST (+%) | £0 | £0 | 0 |
| 20988272 | SIZZLER SET: NO COL-NO SIZE | | | 0 | 11 | 1 | 0 | 2 | | 3 | | | | | | | | |
| 21019915 | BOOK SETS:INDIAN:ONE SIZE | | | 0 | 11 | 1 | 0 | 2 | | 1 | 3500 | | | | | | | |
| 21019914 | BOOK SETS:FRENCH:ONE SIZE | | | 0 | 11 | 1 | 0 | 2 | | 5 | | | | | | | | |
| 21019913 | BOOK SETS:ITALIAN:ONE SIZE | | | 0 | 11 | 1 | 0 | 2 | | 5 | | | | | | | | |
| 20998781 | TORTILLA WARMER:NO COL:ONE SIZE | | | 0 | 11 | 1 | 0 | 2 | | 5 | | | | | | | | |
| 20998937 | BAMBOO SATAY SET:NO COL:ONE SIZE | | | 0 | 11 | 1 | 0 | 2 | | 1 | | | | | | | | |
| 20998932 | CHINESE DIP SET:NO COL:ONE SIZE | | | 0 | 11 | 1 | 0 | 2 | | 2 | | | | | | | | |
| 20998838 | NAAN SET:NO COL:ONE SIZE | | | 0 | 11 | 1 | 0 | 2 | | 2 | | | | | | | | |
| 21003306 | THAI TRAY:NO COL:ONE SIZE | | | 0 | 11 | 1 | 0 | 2 | | 2 | | | | | | | | |
| 20998934 | RICE STEAMER:NO COL:ONE SIZE | | | 0 | 11 | 1 | 0 | 2 | | 2 | | | | | | | | |
| 21003302 | GARLIC BOOK SET:NO COL:ONE SIZE | | | 0 | 11 | 1 | 0 | 2 | | 2 | | | | | | | | |
| 20875492 | CIABATTA SET:NO COLOUR:NO SIZE | | | 0 | 11 | 1 | 0 | 2 | | 2 | | | | | | | | |

RISK ANALYSIS
ERROR TEST
             WORST    BEST
SALES (%)      20      10
UPLIFT (%)
      OK         CANCEL       — 555

| OPTIONS | SCENARIOS | DEMO 1 | DEMO 2 | DEMO 3 | DEMO 1 | DEMO 2 | DEMO 3 | RISK-WORST 1 | RISK-WORST 2 | RISK-WORST 3 | RISK-BEST 1 | RISK-BEST 2 | RISK-BEST 3 |
|---|---|---|---|---|---|---|---|---|---|---|---|---|---|
| OSP | ORIGINAL SELLING PRICE (£) | 222335 | 269689 | 304633 | 222335 | 269689 | 304633 | 222335 | 264458 | 298741 | 222335 | 272305 | 307578 |
| MARKDOWN REPRICE | MARKDOWN/REPRICE (£) | 0 | 40285 | 18622 | 0 | 40285 | 18622 | 0 | 37669 | 16318 | 0 | 41593 | 19773 |
| | MARKDOWN/REPRICE (% OSP) | 0.0 | 14.9 | 6.1 | 0.0 | 14.9 | 6.1 | 0.0 | 14.2 | 5.5 | 0.0 | 15.3 | 6.4 |
| ACTUAL SALES | ACTUAL SALES INC VAT (£) | 222335 | 229404 | 286011 | 222335 | 229404 | 286011 | 222335 | 226789 | 282424 | 222335 | 230712 | 287805 |
| | ACTUAL SALES INC VAT (% OSP) | 100.0 | 85.1 | 93.9 | 100.0 | 85.1 | 93.9 | 100.0 | 85.8 | 94.5 | 100.0 | 84.7 | 93.6 |
| | VAT (£) | 17336 | 17702 | 23929 | 17336 | 17702 | 23929 | 17336 | 17640 | 23929 | 17336 | 17733 | 23929 |
| | ACTUAL SALES EXC VAT (£) | 204999 | 211702 | 262082 | 204999 | 211702 | 262082 | 204999 | 209148 | 258495 | 204999 | 212979 | 263876 |
| | ACTUAL SALES EXC VAT (% OSP) | 100.0 | 84.8 | 93.4 | 100.0 | 84.8 | 93.4 | 100.0 | 85.5 | 94.1 | 100.0 | 84.4 | 93.0 |
| COST | NET COST PRICE (£) | 119225 | 144692 | 163633 | 119225 | 144692 | 163633 | 119225 | 141903 | 160459 | 119225 | 146086 | 165221 |
| | NET COST PRICE (% OSP) | 58.2 | 57.9 | 58.3 | 58.2 | 57.9 | 58.3 | 58.2 | 58.0 | 58.4 | 58.2 | 57.9 | 58.2 |
| | CONTINGENCY COST (£) | | | | | | | | | | | | |
| | PROMOTIONAL EXPENSE (£) | 0 | 0 | 0 | 0 | 0 | 0 | 0 | 0 | 0 | 0 | 0 | 0 |
| PROFIT | PROFIT POST MARKDOWN (£) | 85774 | 67010 | 98449 | 85774 | 67010 | 98449 | 85774 | 67245 | 98036 | 85774 | 66893 | 98656 |
| | PROFIT POST MARKDOWN (% OSP) | 42 | 27 | 35 | 42 | 27 | 35 | 42 | 27 | 36 | 42 | 27 | 35 |
| CMS | CLEARANCE MARKDOWN IN STOCK (£) | 0 | 0 | 0 | 0 | 0 | 0 | 0 | 0 | 0 | 0 | 0 | 0 |
| INDEX | BUYING MARGIN (%) | 41.8 | 42.1 | 41.7 | 41.8 | 42.1 | 41.7 | 41.8 | 42.0 | 41.6 | 41.8 | 42.1 | 41.8 |
| UNITS | SALES (UNITS) | 21678 | 26945 | 30290 | 21678 | 26945 | 30290 | 21678 | 26251 | 29448 | 21678 | 27292 | 30711 |
| | RESIDUAL STOCK (UNITS) | 14349 | 9082 | 10737 | 14349 | 9082 | 10737 | 14349 | 9776 | 11579 | 14349 | 8735 | 10316 |
| SCENARIO PARAMETERS | WEEKS | 7 | 7 | 7 | 7 | 7 | 7 | 7 | 7 | 7 | 7 | 7 | 7 |
| | EXTRA BUY (UNITS) | 0 | 0 | 5000 | 0 | 0 | 5000 | 0 | 0 | 5000 | 0 | 0 | 5000 |
| | MOST FREQUENT PROFILE (NUMBER) | 1 | 2 | 1 | 1 | 2 | 1 | 1 | 1 | 1 | 1 | 1 | 1 |
| | MOST FREQUENT PROFILE (NAME) | BASE CASE | CLEAR P | BASE CASE | BASE CASE | CLEAR P | BASE CASE | BEST CASE | OPT 3 ED | AS IMPORTED | BEST CASE | OPT 3 ED | AS IMPORTED |
| | % OF SKUs APPLIED TO | 100 | 100 | 75 | 100 | 100 | 75 | 75 | 0 | 0 | 75 | 0 | 0 |

Fig. 24

SALES OPTIMIZATION

FIELD OF THE INVENTION

This invention relates to marketing and sales methods and, in particular, to a system and method for analysis of product sales strategies.

BACKGROUND OF THE INVENTION

A product retailer may need to make certain critical decisions in the lifetime of a particular commodity or product. At a certain period during sales activity, he may need to decide whether to mark down the selling price of an item, for example, or to re-buy or cancel other orders. He may wish to know how the numbers of markdowns can be kept to a minimum, or optimally targeted. For the products having good sales results, the retailer may wish to re-buy; for the products having poor sales results, the retailer may wish to cancel out. The decisions made will have a direct impact on realized profits and whether end-of-year targets are met.

If the retailer could better predict the impact of various pricing and promotional strategies, he could better negotiate with his suppliers. If the low-priced merchandise is selling out too early, for example, the selling price can be raised, but the amount should be such that there is no end-of-season over-stock problem.

Thus, there is a particular need for a system and method for more reliably producing such forecasts. Moreover, there is a need for an analytical method for investigating the impact of various re-buy, cancellation, re-price, promotion, and clearance markdown strategies.

BRIEF SUMMARY OF THE INVENTION

The present invention overcomes the problems and limitations of the prior art by accurately and reliably predicting the impact of pricing and promotional strategies on the sales of goods, and the providing an analytical method for investigating the impact of various re-buy, cancellation, re-price, promotion, and clearance markdown strategies. Using the methods and systems of the present invention, retailers and distributors can more effectively price goods to maximize sales of goods during a retail season.

An embodiment of the present invention includes a method for forecasting the effects of a marketing decision on future sales by analyzing product sales strategies using archived sales data obtained from database files. The database files may be validated so as to insure their integrity. An initial sales profile is used with a defined analysis period to calculate an adjusted weekly sales value. An uplifted sales value is found using a selected uplift percentage and a corresponding profit is calculated based on the uplifted sales value. Risk analysis may be performed to yield comparative graphical data and to provide for refinement of the analysis.

Various embodiments of the invention may perform any or all of risk analysis, best case analysis, worst case analysis, and archival of sales value(s).

Various embodiments of the invention may also display and output sales data, optionally based on one or more of a class, subclass, style, option, or product identifier. The output data may further include actuals data listing empirical figures for product sales.

Archived sales data may be formatted according to one or more of a week and a product identifier number, pricing data, stock on hand, commitment and sales units, and tax rate. The data may be output into an ACCESS database or an EXCEL spreadsheet database. The archived sales data may be validated to ensure its integrity before outputting the data to a file by entering one or more of net cost prices and original selling prices. Validation may alternatively be based on checking for new products, checking file entries, or checking new sales data.

Another aspect of the invention is embodied in computer readable instructions stored on a computer readable medium. When one or more computer processors execute the computer readable instructions, the executed instructions cause one or more computers to perform according to the invention as taught herein.

BRIEF DESCRIPTION OF THE DRAWINGS

The invention description below refers to the accompanying drawings, of which:

FIG. 7 is an example of a typical hierarchy text file;

FIG. 9 is an example of a typical actuals text file;

FIG. 13 is an example of a typical sales profile screen;

FIG. 14 is an example of a product hierarchy list;

FIG. 15 shows a base analysis screen used in accessing the analysis tool of the sales optimization system of FIG. 2;

FIG. 16 is an example of a sales data chart;

FIG. 17 is an example of a commitment profiles chart;

FIG. 18 shows a markdown profiles screen;

FIG. 22 shows the risk analysis screen of FIG. 21 including a risk analysis box;

FIG. 23 shows the risk analysis screen of FIG. 21 including a select box for archiving data;

FIG. 24 shows data from a worst risk analysis and data from a best risk analysis;

DETAILED DESCRIPTION OF THE INVENTION

The present invention may be used to perform forecast analysis for pricing and promotional strategies relating to the sale of goods. Multiple forecast scenarios may quickly be analyzed to determine an effective pricing strategy for retail goods. Embodiments of the present invention provide methods and systems for analyzing the impact of various re-buy, cancellation, re-price, promotion, and clearance markdown strategies. Based on the analysis performed, retailers and distributors can more effectively price goods so that goods do not get sold too quickly due to underpricing, resulting in a shortage of goods, and there are not goods remaining at the end of the season because the goods were priced too high.

Figure 1:
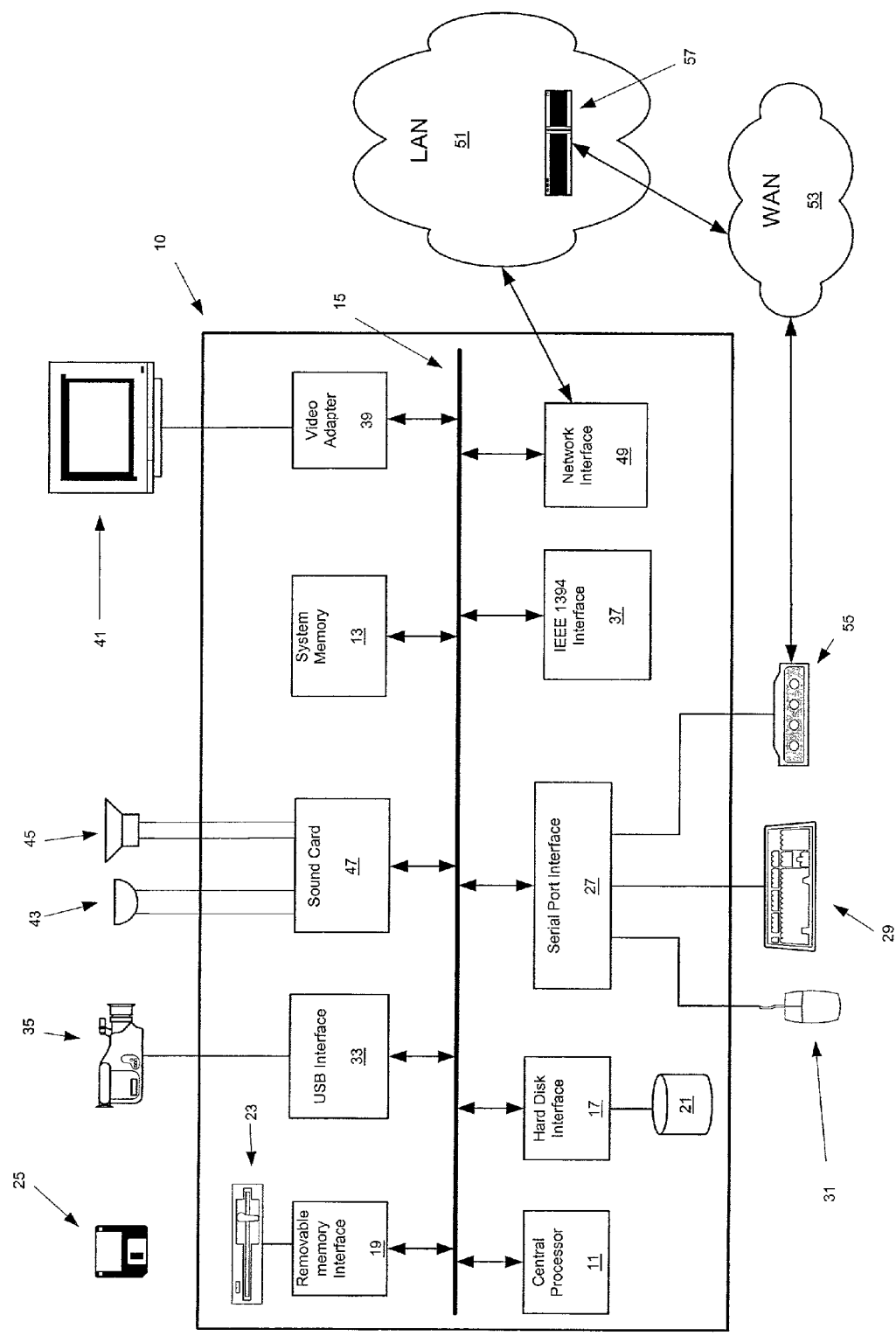
FIG. 1 is a basic block diagram of a sales system.

In order to provide solutions that optimize sales and analyze sales strategies, the present invention is preferably implemented in conjunction with one or more computers and optionally one or more networks. Aspects of the present invention may be embodied in a computer system, such as the computer system 10 shown in FIG. 1. The computer system 10 includes a central processor unit 11, a system memory 13 and a system bus 15 which couples various system components, including the system memory 13, to the central processor unit 11. The system bus 15 may comprise one of any of several types of bus structures, including a memory bus or memory controller, a peripheral bus, or a local bus using any of a variety of bus architectures. The structure of the system memory 13 is well known to those skilled in the art and may include a basic input/output system (BIOS) stored in a read only memory (ROM), and one or more program modules, such as operating systems, application programs, and program data, stored in random access memory (RAM).

The computer system 10 may also include a variety of interface units and drives for reading and writing data. In way of example, the computer system 10 may include a hard disk interface 17 and a removable memory interface 19, coupling a hard disk drive 21 and a removable memory drive 23, respectively, to the system bus 15. The removable memory drive 23 may include a magnetic disk drive or an optical disk drive. The drives for reading and writing data, and their associated computer-readable media, such as a floppy disk 25, provide nonvolatile storage of computer readable instructions, data structures, program modules and other data for the computer system 10. It should be understood that, although only one hard disk drive 21 and one removable memory drive 23 are shown for clarity of illustration, the computer system 10 may include several of either or both such drives. Furthermore, the computer system 10 may include additional drives for interfacing with other types of computer-readable media.

A user can interact with the computer system 10 using a number of input devices. In the illustration provided, a serial port interface 27 couples a keyboard 29 and a pointing device 31 to the system bus 15. The pointing device 31 may be implemented as a mouse, a track ball, a pen device, or other such similar device. Of course, one or more other input devices (not shown) such as a joystick, a game pad, a satellite dish, a scanner, a touch sensitive screen, or the like, may be connected to the computer system 10.

The computer system 10 may include additional interfaces for connecting still more devices (not shown) to the system bus 15. A universal serial bus (USB) interface 33 couples a video or digital camera 35 to the system bus 15. An IEEE 1394 interface 37 may be used to couple additional devices (not shown) to the computer system 10. Furthermore, the IEEE 1394 interface 37 may be configured to operate with particular manufacture interfaces, such as FireWire developed by Apple Computer and i.Link developed by Sony Corporation. Input devices may also be coupled to the system bus 15 through a parallel port, a game port, a PCI board, or any other interface used to couple and input device to a computer.

The computer system 10 may also include a video adapter 39 coupling a display device 41 to the system bus 15. The display device 41 may include a cathode ray tube (CRT), a liquid crystal display (LCD), a field emission display (FED), a plasma display, or any other device that produces an image that is viewable by the user. Additional output devices, such as a printing device (not shown), may be connected to the computer system 10.

Sound can be recorded and reproduced with a microphone 43 and a speaker 45. A sound card 47 may be used to couple the microphone 43 and the speaker 45 to the system bus 15. One skilled in the art will appreciate that the particular device connection configuration is shown for illustration purposes only, and that several of the peripheral devices could be coupled to the system bus 15 via alternative interfaces. For example, the video camera 35 could be connected to the IEEE 1394 interface 37, and the pointing device 31 could be connected to the USB interface 33.

The computer system 10 can operate in a networked environment using logical connections to one or more remote computers or other devices, such as a server, a router, a network personal computer, a peer device or other common network node, a wireless telephone, or a wireless personal digital assistant. The computer system 10 includes a network interface 49 that couples the system bus 15 to a local area network (LAN) 51. Networking environments are commonplace in offices, enterprise-wide computer networks, and home computer systems.

A wide area network (WAN) 53, such as the Internet, can also be accessed by the computer system 10. A modem unit 55 is shown connected to the serial port interface 27 and to the WAN 53. The modem unit 55 may be located within or external to the computer system 10, and may comprise any type of conventional modem, such as a cable modem or a satellite modem. The LAN 51 may also be used to connect to the WAN 53 via a router 57 in accordance with conventional practices.

It will be appreciated by one skilled in the relevant art that the network connections shown are exemplary and that other ways of establishing a communications link between computers can be used. The existence of any of various well-known protocols, such as TCP/IP, Frame Relay, Ethernet, FTP, HTTP, and the like, is presumed, and the computer system 10 can be operated in a client-server configuration to permit a user to retrieve web pages from a web-based server. Furthermore, any of various conventional web browsers can be used to display and manipulate data on web pages.

The operation of the computer system 10 can be controlled by a variety of different program modules. Examples of program modules are routines, programs, objects, components, and data structures that perform particular tasks or implement particular abstract data types. The present invention may also be practiced with other computer system configurations, including hand-held devices, multiprocessor systems, microprocessor-based, or programmable consumer electronics, network PCS, minicomputers, mainframe computers, personal digital assistants, and the like. Furthermore, the invention may also be practiced in distributed computing environments where tasks are performed by remote processing devices that are linked through a communications network. In a distributed computing environment, program modules may be located in both local and remote memory storage devices.

Figure 2:
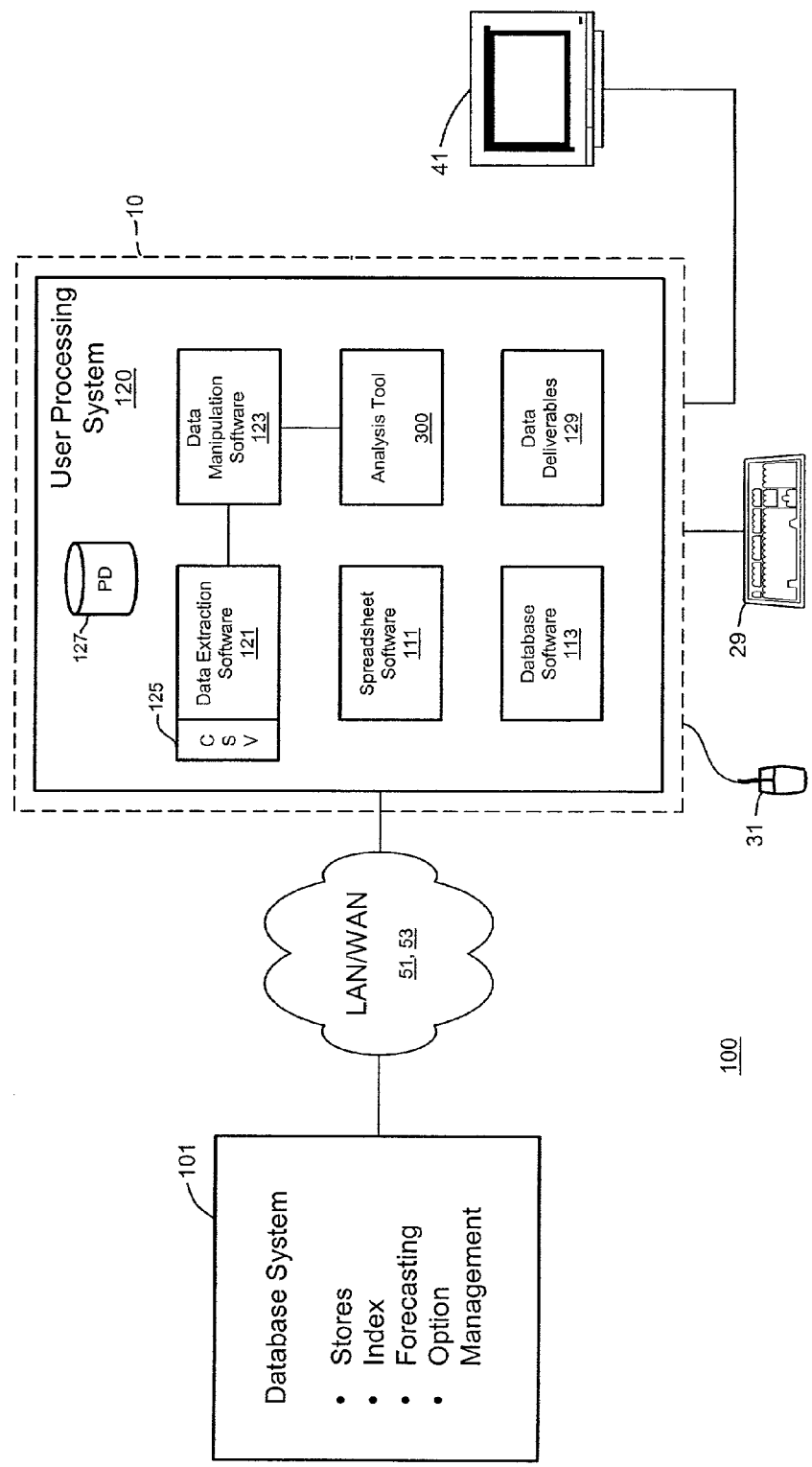
FIG. 2 is a generalized functional block diagram of a sales optimization system including a database system and a processing system.

FIG. 2 illustrates a generalized functional block diagram of a sales optimization system 100 as can be used for analysis of sales and profit data for a marketing organization in accordance with the present invention. Archived data is retrieved from a database system 101 via a network, such as the LAN 51 or WAN 53, and provided a user processing system 120 resident in the computer system 10. The user of the sales optimization system 100 processes the archived data and inputs sales data via the keyboard 29, in combination with the mouse 31. Data processing is performed using an analysis tool 300 to produce a plurality of data deliverables 129, as described in greater detail below. The data deliverables 129 may be output from the user processing system 120 to the system display 41. In a preferred embodiment, the data deliverables 129 may include Hierarchy Data, Actuals Data, Forecast Data, and Commitment Data.

The user processing system 120 includes data extraction software 121 and data manipulation software 123 for importing and processing data from the database system 101. In a preferred embodiment, the data extraction software 121 includes a Comma Separated Variable (CSV) file interface 125 for performing CSV data extraction, for example, from one or more legacy databases in the database system 101. The data manipulation software 123 provides for the storage of interim CSV files in a processing database 127 using database software 113. The data manipulation software 123 also provides for the manipulation of sales and profit data using weekly table updates, and provides for file creation and export to network destinations using spreadsheet software 111.

Figure 3:
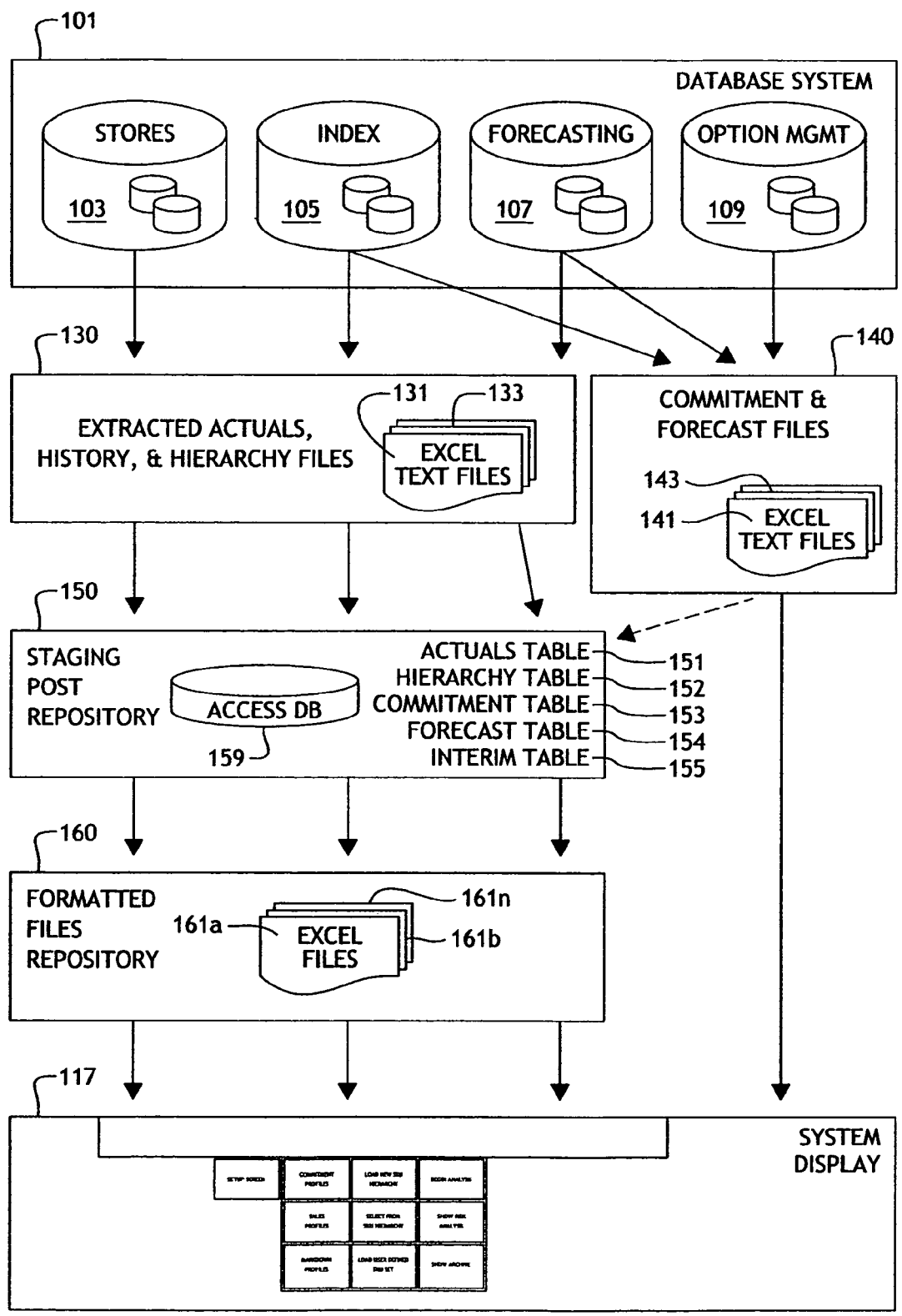
FIG. 3 is a functional block diagram illustrating the flow of data from the database system of FIG. 2 to a system display.

The database system 101 may include a stores legacy database 103, an index database 105, a forecasting database 107, and an option management database 109, as shown with additional reference to FIG. 3. The user processing system 120 functions to extract Hierarchy Data and Actuals Data from the database system 101 into a set of Extracted Actuals, History, and Hierarchy (EAH&H) files 130 configured as spreadsheet text files, preferably EXCEL text files. The set of EAH&H files 130 includes Hierarchy text files 131 and Actuals text files 133. The Actuals text files 133 are formatted into Actuals tables 151 in a relational database 159, such as an ACCESS database, located in a staging post repository 150. Likewise, the Hierarchy text files 131 are formatted into Hierarchy tables 152 located in the relational database 159. Additional data are included in Interim tables 155. The Actuals tables 151 and the Hierarchy tables 152 are formatted into one or more spreadsheet files 161a, 161b, . . . , 161n, in a Formatted Files Repository 160, for retrieval and further use via the system display 117. The user utilizes the system display 117 to retrieve and display the spreadsheet files 161a, 161b, . . . , 161n, as described in greater detail below.

The user processing system 120 also functions to extract Commitment Data and Forecast Data from the database system 101 into a set of Extracted Commitment and Forecast (EC&F) files 140. The extracted Commitment Data are configured as Commitment spreadsheet text files 141 and the extracted Forecast Data are configured as Forecast spreadsheet text files 143. The Commitment spreadsheet text files 141 and the Forecast spreadsheet text files 143 can be called up for viewing on the system display 117.

In an alternative preferred embodiment, the Commitment spreadsheet text files 141 and the Forecast spreadsheet text files 143 are formatted into Commitment tables 153 and Forecast tables 154, respectively, located in the staging post repository 150. The Commitment tables 153 and the Forecast tables 154 are included in the spreadsheet files 161a, 161b, . . . , 161n for retrieval and further use via the system display 117.

Figure 4:
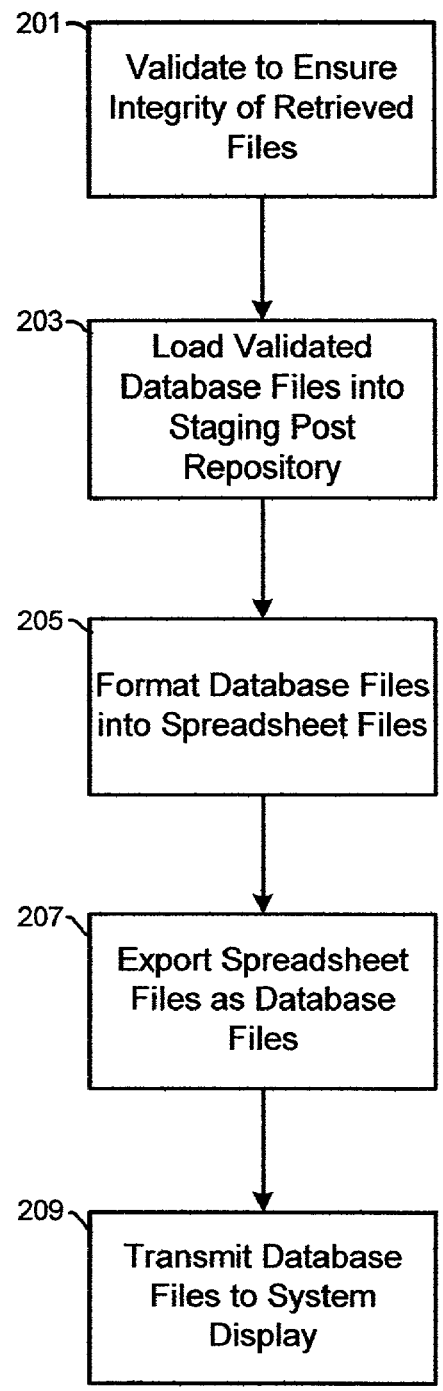
FIG. 4 is a flow diagram illustrating a file extraction process performed by the processing system of FIG. 2.

The file extraction process performed by the user processing system 120 is illustrated in the flow diagram of FIG. 4 where validation is performed to ensure the integrity of the files retrieved from the database system 101, at step 201. Following validation of the files, the validated database files are loaded into the staging post repository 150, at step 203. At this stage, the Actuals table 151, the Hierarchy table 152, and the Interim table 155 are created. The validated database files are formatted into spreadsheet files, at step 205, and exported to the formatted files repository 160, at step 207. From the formatted files repository 160, the spreadsheet files are exported to the system display 170, at step 209.

Figure 5:
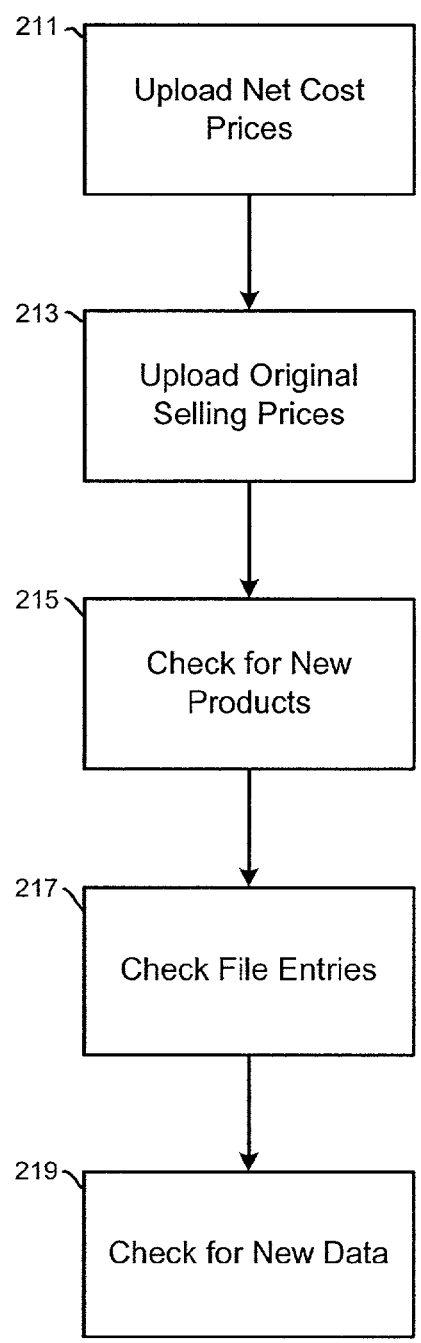
FIG. 5 is a flow diagram illustrating a process of file validation.

The process of validation to ensure file integrity, step 201 above, is shown in greater detail in the flow diagram of FIG. 5, in which net cost prices are uploaded for any Stock Keeping Unit (SKU) code item having a zero value, at step 211. The Original Selling Prices (OSPs) are then uploaded for each of the SKUs having a zero value, at step 213. A check for New Products is performed next, at step 215. The files are checked for zero Actuals and for the correct week, at step 217. Then, a sense check is made to ensure that a new week's data has been extracted, at step 219.

Figure 6:
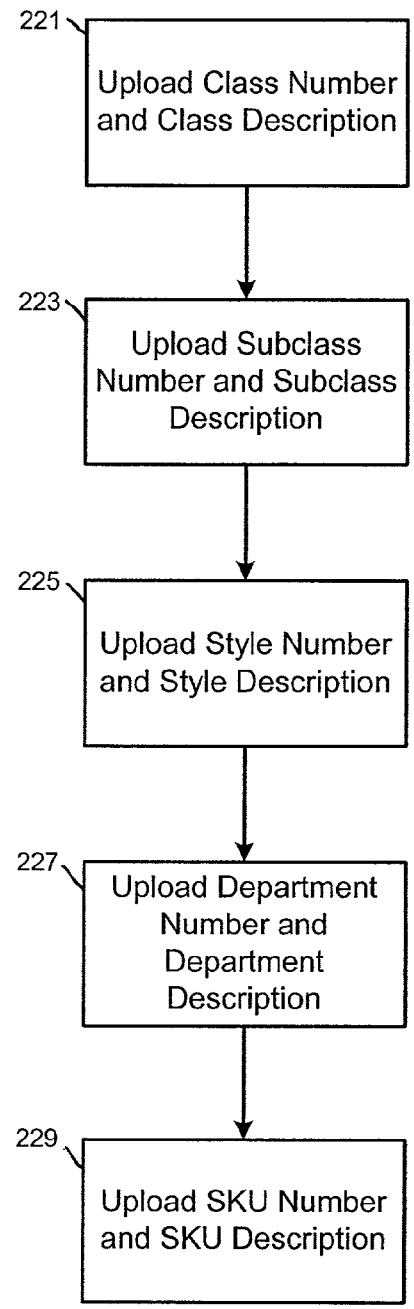
FIG. 6 is a flow diagram illustrating a process of entering information into a hierarchy text file.

For the Hierarchy text file 131, information is uploaded in the sequence shown in the flow diagram of FIG. 6. The Class Number (CLANUM) and the Class Description (CLADES) are uploaded, in step 221. The Subclass Number (SCLNUM) and the Subclass Description (SCLDES) are uploaded, in step 223. The Style Number (STYNUM) and the Style Description (STYDES) are uploaded, in step 225. The Department Number (DPTNUM) and the Department Description (DPT-DES) are uploaded, in step 227, and the SKU Number (SKUNUM) and the SKU Description (SKUDES) are uploaded, in step 229. Part of a typical Hierarchy text file 131 produced by the procedure of FIG. 6 is shown in FIG. 7.

Figure 8:
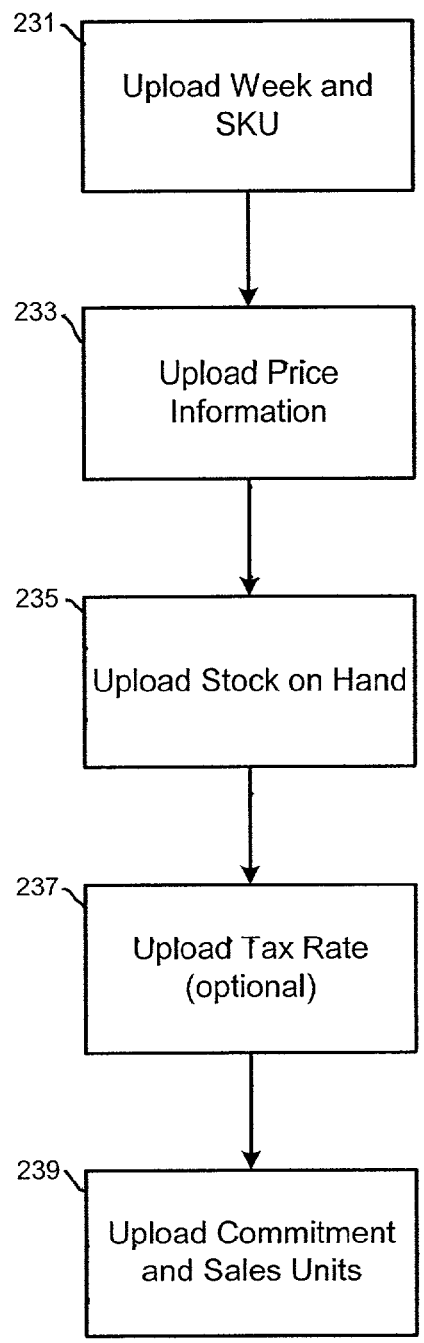
FIG. 8 is a flow diagram illustrating a process of entering information into an actuals text file.

For the Actuals text file 133, information is uploaded as shown in the flow diagram of FIG. 8. The Current Week Number and the individual SKUNUM are uploaded, at step 231. The Average Cost (COST) based on units sold, or weighted average cost, and the Selling Price before any markdown (i.e., OSP) are uploaded, at step 233. The amount of Stock on Hand (SOH) is uploaded, at step 235. A Tax Rate (VAT) may optionally be uploaded, at step 237. The amount of asset contracted for delivery or placed on order (CONSTK), and the quantity of sales units by week is uploaded, at step 239. Part of a typical Actuals text file 133 produced by the procedure illustrated in FIG. 8 is shown in FIG. 9.

Figure 10:
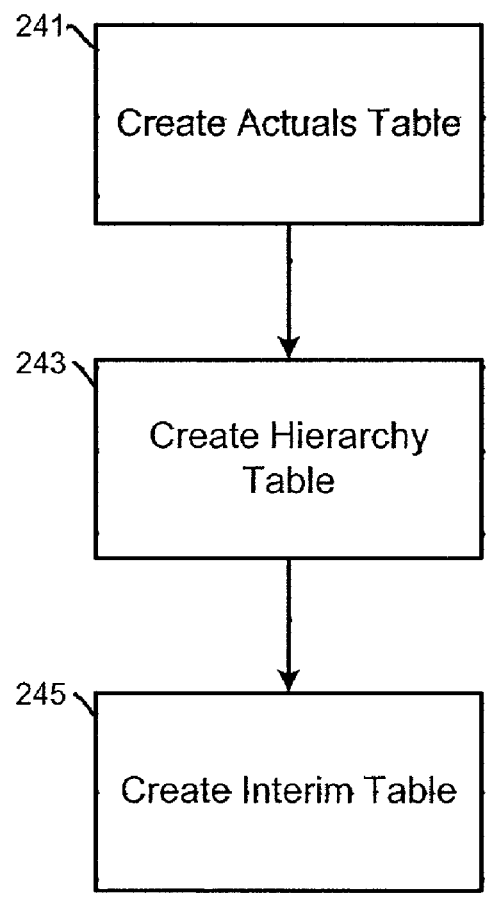
FIG. 10 is a flow diagram illustrating a process of loading files into a staging post repository.

The process of loading files into the staging post repository 150, step 203 above, is shown in greater detail in FIG. 10, where the Actuals table 151 is created, at step 241, the Hierarchy table 152 is created, at step 243, and the Interim table 155 is created, at step 245. The Actuals table 151, created from the Actuals file 133, preferably includes the following fields:

| | |
|---|---|
| WEEKNUM | current week |
| SKUNUM | SKU number |
| COLOR | |
| COST | |
| OSP | original selling price |
| SOH | stock on hand |
| TAX | tax rate |
| CONSTK | contracted stock |
| Week Number | |

The Hierarchy file 131 is saved as a .CSV file and loaded into the hierarchy table 152. Seasonal specific data may be required. The Hierarchy table 152 preferably includes the following fields:

| | |
|---|---|
| CLANUM | class number |
| CLADES | class description |
| SCLNUM | subclass number |
| SCLDES | subclass description |
| STYNUM | style number |
| STYDES | style description |
| OPTNUM | option number |
| OPTDES | option description |
| SKUNUM | SKU number |
| SKUDES | SKU description |

The Interim table 155 preferably includes the following fields:

| | |
|---|---|
| SKUNUM | SKU number |
| COLOR | |
| COST | |
| OSP | original selling price |
| SOH | stock on hand |
| TAX | tax rate |
| CONSTK | contracted stock |
| Week Number | |

The database system 101 includes the archive parameters listed below along with their arithmetic equivalents.

$$\text{Sales At OSP} = \text{Sales Units} \times \text{OSP} \tag{1}$$

where OSP is the Original or Comparable Selling Price.

$$\text{Markdown/Reprice} = \text{Markdown} \times \text{Sales Units} \tag{2}$$

$$\text{Markdown /Reprice (\% OSP)} = \frac{\text{Markdown}}{\text{Sales At OSP}} \times 100 \tag{3}$$

$$\text{Actual Sales Including Tax} = \text{Sales At OSP} - \frac{\text{Markdown}}{\text{Reprice}} \tag{4}$$

$$\text{Actual Sales Including Tax (\% OSP)} = \frac{\text{Sales Including Tax}}{\text{Sales At OSP}} \times 100 \tag{5}$$

$$\text{Tax Amount} = \text{Actual Sales Incl Tax} - \frac{\text{Actual Sales Incl Tax}}{1 + \text{Tax Rate}} \tag{6}$$

$$\text{Actual Sales Excluding Tax} = \text{Actual Sales Including Tax} - \text{Tax Amount} \tag{7}$$

$$\text{Actual Sales Excluding Tax (\% OSP)} = \frac{\text{Sales At OSP}}{1 + \text{Tax Rate}} \times \frac{100}{\text{Actual Sales Excluding Tax}} \tag{8}$$

$$\text{Net Cost Price} = \text{Net Unit Cost} \times \text{Sales Units} \tag{9}$$

$$\text{Net Cost Price (\% OSP)} = \frac{\text{Net Cost Price}}{\text{Sales At OSP}/(1 + \text{Tax Rate})} \tag{10}$$

$$\text{Profit} = \text{Actual Sales Excluding Tax} - \text{Net Cost Price} \tag{11}$$

$$\text{Profit (\% OSP)} = \frac{\text{Profit Post Markdown}}{\text{Sales At OSP}/(1 + \text{Tax Rate})} \times 100 \tag{12}$$

where Post Profit Markdown is found using the formula, $$\text{Post Profit Markdown} = \frac{\text{Actual Sales}}{1 + \text{Tax Rate}} - \text{Net Cost Price Value} \tag{13}$$

Figure 11:
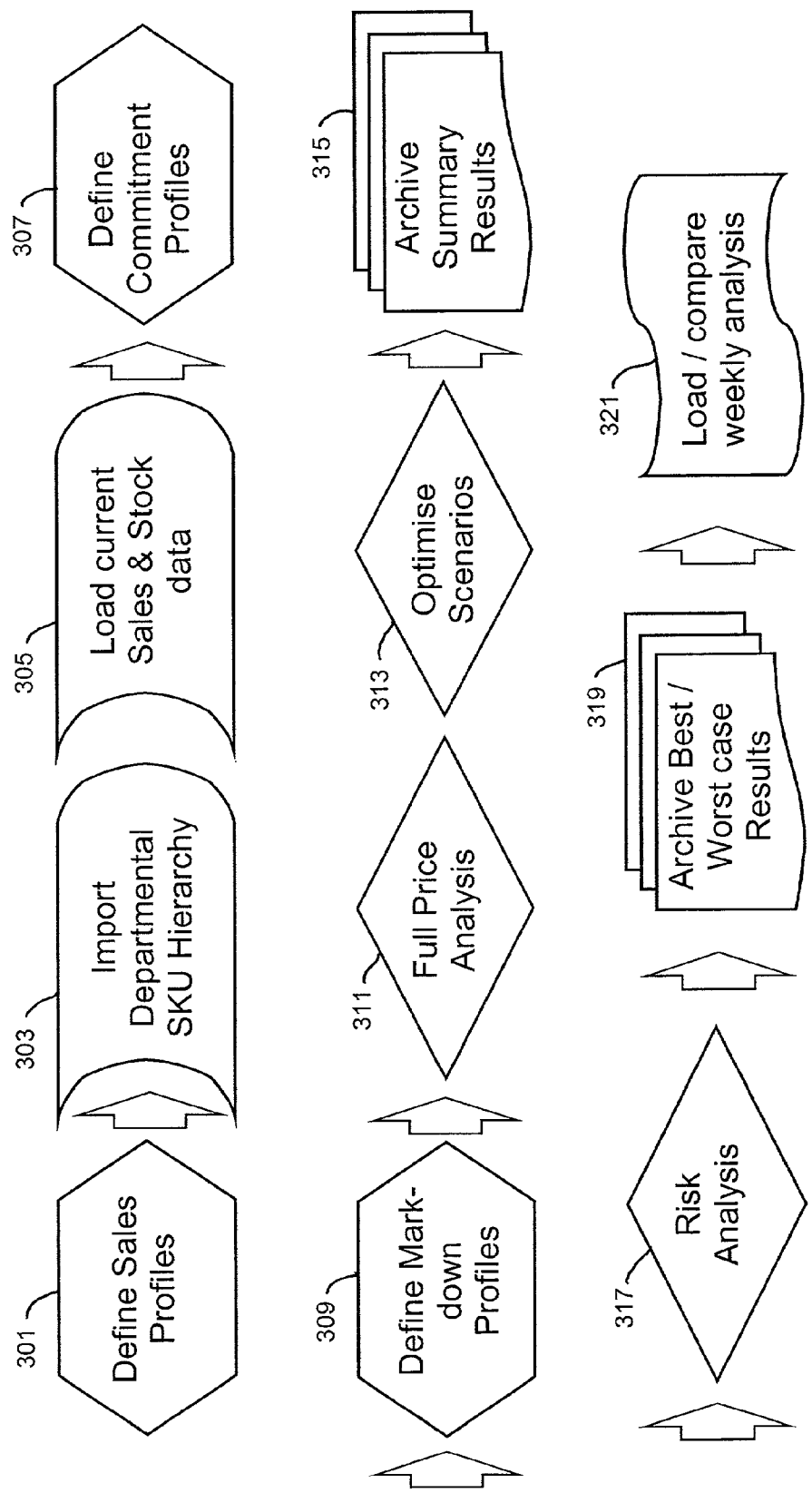
FIG. 11 is a flow diagram illustrating an analysis process used in deriving data deliverables.

The generalized process flow followed by the analysis tool 300 in deriving the data deliverables 103 is shown in FIG. 11. Sales profiles are defined, at step 301. The departmental SKU hierarchy is imported, at step 303. The current sales and stock data are loaded, at step 305. The commitment profiles are defined, at step 307. The mark-down profiles are defined, at step 309. The user conducts a full-price analysis using the analysis tool 300, at step 311. The scenarios selected by the user are optimized, at step 313. The user may archive results as required, at step 315. Subsequently, the user may elect to perform risk analysis, at step 317. The best and worst case results from the risk analyses are archived as required, at step 319. The weekly analysis can then be loaded and compared, at step 321. The above steps 301-321 are explained in greater detail, below.

Figure 12:
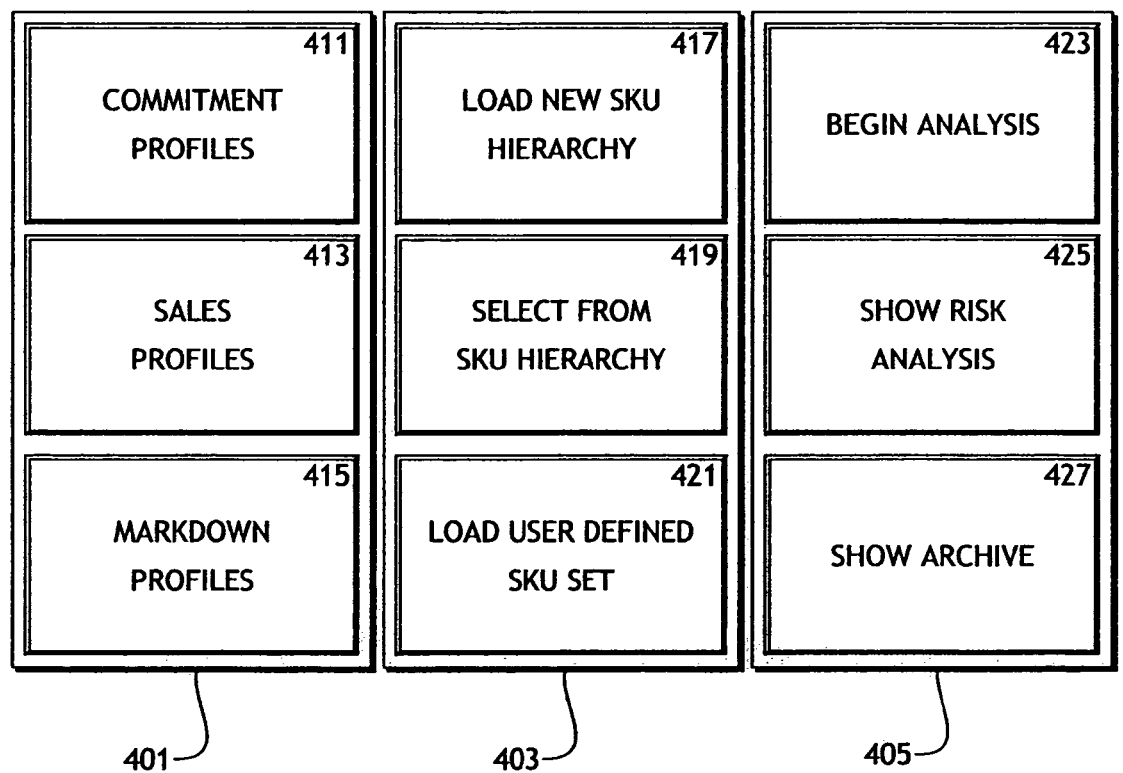
FIG. 12 shows a primary user interface for accessing an analysis tool in the sales optimization system of FIG. 2.

The analysis tool 300 is controlled via a primary user interface 400, such as shown in FIG. 12, which provides the user of the sales optimization system 100 access to a Profile Definition functional area 401, a Data Input functional area 403, and an Analysis and Archive functional area 405. The Profile definition functional area 401 includes a Commitment Profiles button 411, a Sales Profile button 413, and a Markdown Profiles button 415. The Data Input functional area 403 includes a Load New SKU Hierarchy button 417, a Select from SKU Hierarchy button 419, and a Load User-Defined SKU Set button 421. The Analysis and Archive functional area 405 includes a Begin Analysis button 423, a Show Risk Analysis button 425, and a Show Archive button 427.

The analysis tool 300 builds demand for a particular analysis period (i.e. a week x to a week y) based on a historical sales level and a defined sales profile, such as shown in a Sales Profile screen 430 in FIG. 13. This corresponds to step 301, above. The sales profile is applied at SKU level to generate the shape of future demand. The general procedure is described using the illustrative examples of FIGS. 13-19 to show how profiles are built from a library, and how profiles can be constructed at a high level of the hierarchy, or configured by option or by SKU.

The analysis tool 300 incorporates a graphical facility to allow multiple profiles to be viewed at the same time. In the example provided, the analysis tool 300 interfaces with the database system 101 to load a product hierarchy 440 for Class 514 'Food Gifts,' a partial list of which is shown in FIG. 14. This corresponds to step 303, above. The product hierarchy 440 includes a Class Number column 441 listing the hierarchy class and a corresponding Class Description column 442. In a preferred embodiment, the analysis tool 300 can load a set of up to three thousand SKUs, and frequently-used sets of SKUs can be saved for recall in future analyses. A lower tier of identifiers appears in a Sub-class Number column 443 with a corresponding Sub-Class Description column 444.

The user can then select from any level of the product hierarchy 440, particular products to be analyzed in a scenario. In the example, the user has selected for analysis a set 445 of SKUs corresponding to Subclass 214 'Cook Sets.' The Subclass 214 set 445 includes the first twelve SKU numbers, shown in an SKU Number column 447, and the associated product descriptions, shown in an SKU Description column 449. The selected list is imported into a Base Analysis screen 450, shown in FIG. 15. Entries from the SKU Number column 447 and the SKU Description column 449 appear as an SKU Number column 451 and an SKU Description column 453, respectively, in the Base Analysis screen 450.

Some of the Analysis Parameters used in providing data to the Base Analysis screen 450 are determined by the analysis tool 300 in accordance with the formulae given below. For example, the analysis tool 300 calculates an adjusted weekly sale based on the sales profile and the sales history for a selected period of weeks. The Average Sales Index is the average index across the entire profile. The Weekly Sales Index is the value for a given week entered to form a Sales Profile.

$$\text{Adjusted Sales Value} = \frac{\text{Total Normalised Sale}/\text{Weeks Of Positive Sale}}{\text{Average Sales Index}} \times \text{Weekly Sales Index} \quad (14$$

The Total Normalized Sale, which is the quantity of units sold in the selected period, is found from the formula, $$\text{Normalised Sale (week)} = \frac{\text{Average Sales Index}}{\text{Weekly Sales Index}} \times \text{Sales in Given Week for Given Week} \quad (15$$

The total Normalized Sales are summed to give the Total Normalized Sale value used in formula (14), above. The analysis tool 300 also calculates a weekly Base Sale parameter, $$\text{Base Sale (week)} = \frac{\text{Sales for Imported Week}}{\text{Profile Value for Imported Week}} \times \text{Profile Value in Given Week} \quad (16$$

A weekly uplifted sale variable is also determined. The uplifted sale variable is either a normal sale value, or a value uplifted by a modeled scenario, $$\text{Uplifted Sales (week)} = \text{Base Sale (week)} \times \left[1 + \frac{\text{Price Reduction}}{100}\right] \quad (17$$

A value is calculated at full price for the uplifted sale, $$\text{Uplifted Sale Value (week)} = \text{Uplifted Sale (week)} \times OSP \times \left[1 - \left(\frac{\text{Price Reduction}}{100}\right)\right] \quad (18$$

$$\text{Cost} = \text{Uplifted Sale (week)} \times \text{Cost Price} \quad (19$$

$$\text{Profit} = (\text{Uplifted Sale} - \text{Total Cost}) - \left(\text{Markdown Cost} + \frac{\text{Scenario Cost}}{\text{No. of SKUs in Analysis}}\right) \quad (20$$

The Stock Cost of Markdown (SCM) calculation is executed if the week is flagged in a Markdown profiles screen 480 (FIG. 18, below). Note that the Current Price is the OSP or the subsequent reprice only, and does not include a promotional price.

SCM (cur_week)=Closing Stock (prev_week)×
Current Price (prev_week)−Closing Stock
(prev_week)× New Current Price (21)

Once the SKU list has been imported, the user allocates sales profiles. The analysis tool 300 imports the necessary input data for each SKU, including sales profiles, and also imports the necessary input data for each SKU, including sales, stock, unit cost, tax rate, and original selling price, from the database system 101. This corresponds to step 305, above. A Sales Data chart 460, shown in FIG. 16, includes an SKU Number column 461, an SKU Description column 463, and a selected Sales Profile column 465.

The analysis tool 300 incorporates a facility to reference a number of weeks sales history (i.e., week x to week y), compare the sales history to the selected sales profile, and adjust the sales value it imports to factor out sales variability in recent data. Continuing with the example provided, a set of Sales Data 467, covering sales weeks 19-24 and corresponding to the Subclass 214 'Cook Sets,' is imported into the Base Analysis screen 450 as a Stock On Hand (SOH) column 455, as shown in FIG. 15. The Stock On Hand, or Surplus Units, is the stock remaining in the supply chain, in units, at the end of the analysis period. As used in the present analysis, Missed Sales for the analysis period is the sales potential (i.e., had there been 100% stock availability) less total actual sales. The analysis tool 300 uses a library of markdown profiles to define markdown strategies. These markdown profiles provide a week-by-week relationship between price reduction and demand uplift, which are allocated at any level of the corresponding product hierarchy. The user is also able to separate 're-price events' from promotional activity to enable the measurement of the retail revaluing of stock at a given time. A Commitment Profiles screen 470 is shown in FIG. 17. This corresponds to step 307 in FIG. 11, above.

Markdown Profiles are entered as a percentage reduction in price and the accompanying uplift in demand. This corresponds to step 309 in FIG. 11, above. To write a Markdown Profile, the user selects the Markdown Profiles button 415, in FIG. 12, to pull up a Markdown Profiles screen 480, as shown in FIG. 18. The analysis tool 300 allows contracted stock deliveries to be phased across the season allowing the user to examine the impact of improved intake planning and supplier/merchandising coordination. This feature also allows a measure of the retail revaluation of stock in the case of re-price activity. The analysis tool 300 also allows the user an over-ride, scheduling all contracted stock to arrive at the start of the analysis period. The profiles also allow an analysis period to be investigated where available contacted stock is not delivered.

Figure 19:
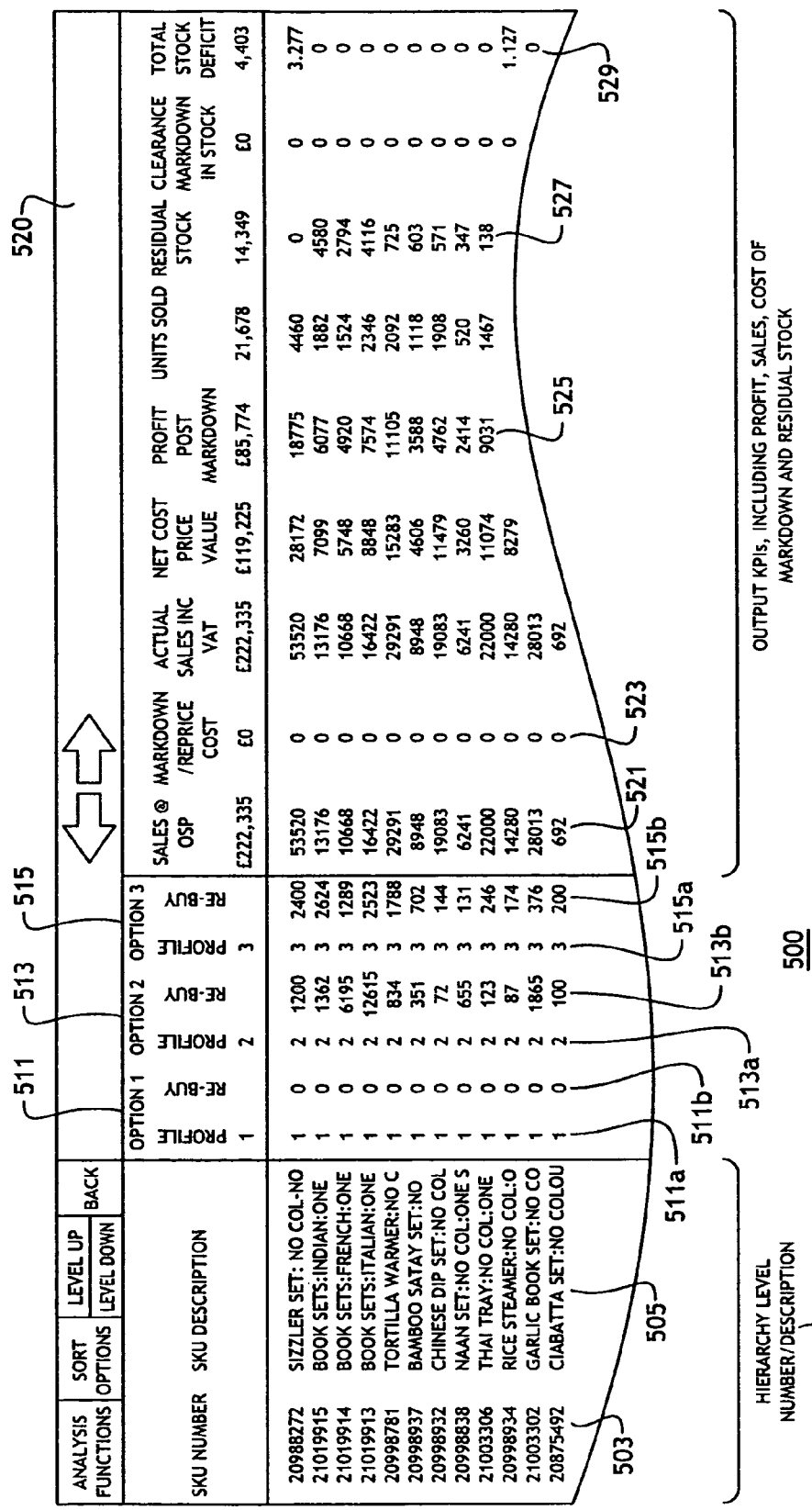
FIG. 19 shows the base analysis screen of FIG. 15 with data provided by an option evaluation procedure.

The analysis tool 300 makes use of an analysis screen 500, shown in FIG. 19, which displays all information related to each SKU. In the example provided, a hierarchy level list 501 includes a column of SKU numbers 503 and a column of corresponding SKU descriptions 505. The analysis screen 500 allows the user to enter different markdown and re-buy option scenarios for sales, profit, and stock analysis. In the example provided, the user has specified for a first scenario 511 (Option 1) a first markdown profile, indicated as profile '1' in a Profile column 511a, and a zero re-buy option, indicated by '0' in a Re-Buy column 511b. The first scenario 511 is a full price scenario.

For a second scenario 513 (Option 2), the user has selected a second markdown profile, indicated as profile '2' in a Profile column 513a, and various re-buy options in a Re-Buy column 513b. For example, in the second scenario 513, the re-buy option for the item having SKU 20988272 is 1200, and the re-buy option for the item having SKU 21019915 is 1362. The second scenario 513 represents a client's current business practice. Likewise, for a third scenario 515 (Option 3), the user has selected a third markdown profile, indicated as profile '3' in a Profile column 515a, and various re-buy options in a Re-Buy column 515b. In the third scenario 515, the re-buy option for the item having SKU 20988272 is 2400, and the re-buy option for the item having SKU 21019915 is 2624. The third scenario 515 is an optimized plan based on the results of an earlier full-price analysis.

Results for each of the three scenarios 511-513 are output and presented to the right of the re-buy column 515a. The first scenario output 521 is shown, including a Sales at OSP column 521, a Cost of Markdown column 523, a Profit column 525, and a Residual Stock column 527. The analysis can be aggregated to any level of the hierarchy for viewing, or stored at the highest level in a predefined archive, as described in greater detail below. The numerical entry in the Profit Post Markdown column 525 is found from formula (13) above. The Residual Stock column 527 lists the stock left at the end of the set time period. The Total Stock Deficit column 529 lists the potential sale for the period had there been 100% stock availability.

As stated earlier, the first scenario 511 is essentially a 'full-price' analysis tool. This tool allows an initial analysis to be run on a predefined full-price basis (i.e., no markdown) and zero re-buy. This enables the user to identify those SKUs which require markdown activity to clear residual stock, or those SKUs which will be targets for re-buy decisions. Once this analysis has been conducted, the user can sort the resulting SKU list by residual stock, to identify those SKUs requiring merchandising attention or re-buy decisions, as described in greater detail below.

The analysis tool main screen 500 includes Sort functions to assist in determining which SKUs may require marking down to minimize residual stock, and which SKUs may require extra stock. In a preferred embodiment, the analysis tool 300 is further designed to run different markdown/re-buy scenarios simultaneously. This allows, for example, a comparison of the first scenario 511 (i.e., full-price) with the second scenario 513 (i.e., current business practice), and a comparison of the first scenario 511 with the third scenario 515 (i.e., optimized plan).

Figure 20:
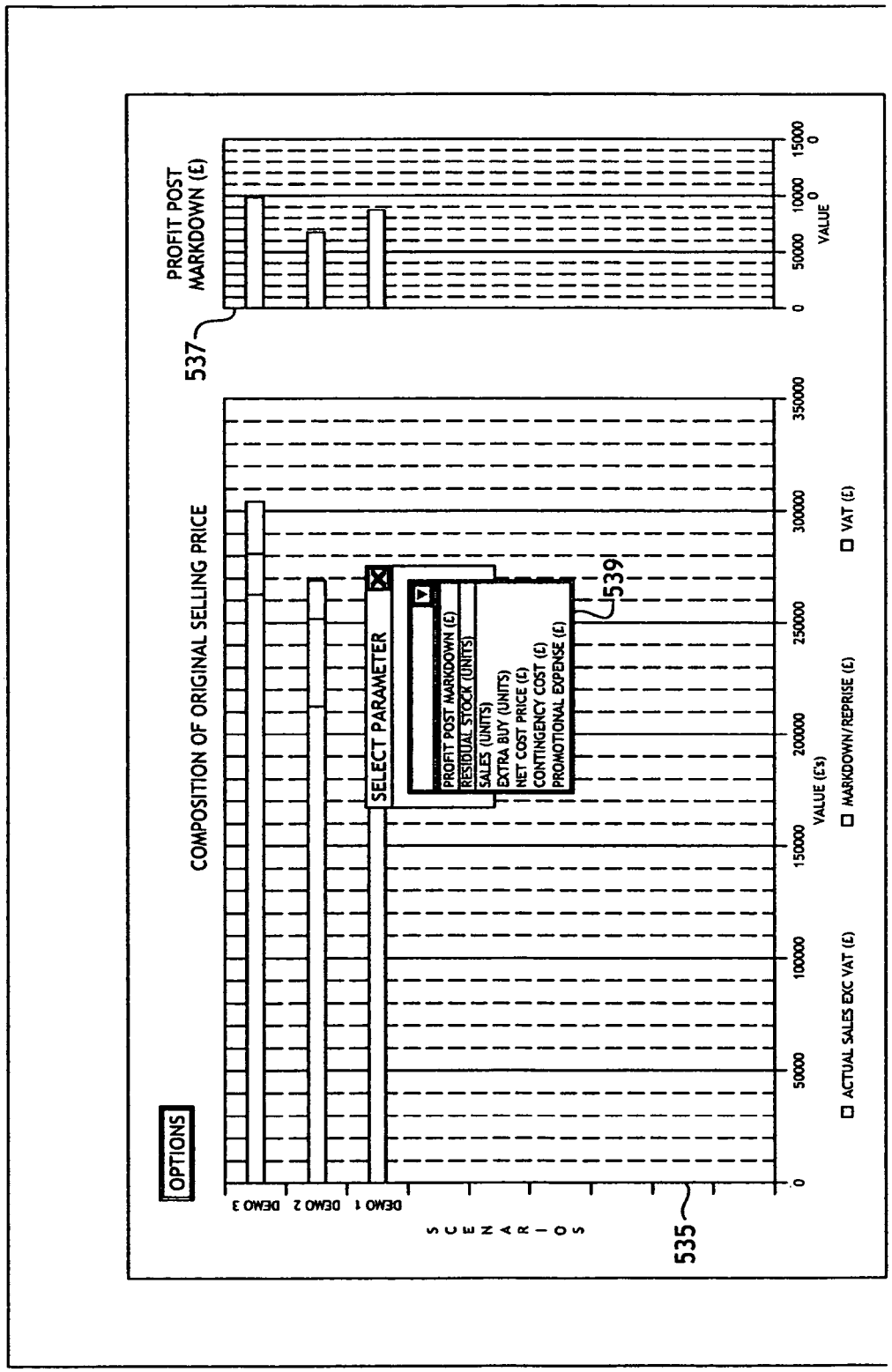
FIG. 20 is a bar graph derived from archived data.

Once the scenarios 511-515 have been run, the analysis tool 300 gives the user the option to save the results. The user can also elect to produce a first bar graph 535 showing sales breakdown for the selected scenarios along with a second, related bar graph 537, as shown in FIG. 20. The second bar graph 537 can present the Profit Post Markdown numbers as shown, for example, or other numbers listed in a parameter table 539.

Figure 21:
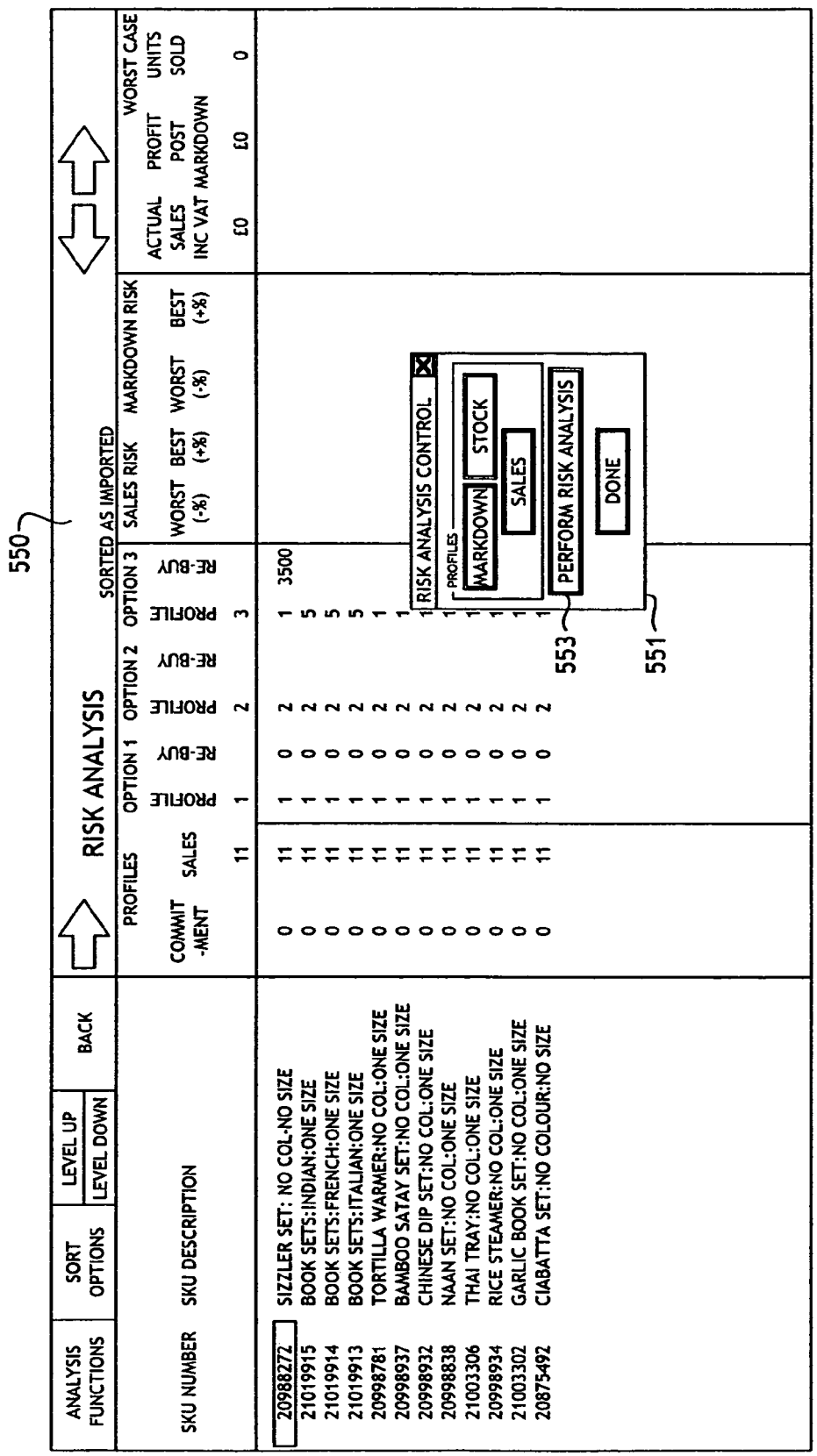
FIG. 21 shows a risk analysis screen including a risk analysis control box.

Once an optimized scenario has been developed using the procedure described above, the user can elect to export the resulting data to a Risk Analysis function by means of a Risk Analysis screen 550, shown in FIG. 21. The Risk Analysis function is accessed via a Perform Risk Analysis button 553 in a Risk Analysis Control box 551. Selecting the Perform Risk Analysis button 553 brings down a Risk Analysis box 555, shown in FIG. 22. The Risk Analysis function allows the user to identify the sensitivity of the optimized scenario results to unexpected sales or to promotional performances. In way of example, the user may wish to evaluate the impact of a promotional sales uplift delivering a 'worst case' (i.e., 20% fewer sales than originally anticipated) or a 'best case' (i.e., 10% more sales than originally anticipated). These parameters are selected using the Risk Analysis box 555. The Risk Analysis function offers the full functionality of the Base Analysis screen 450, above, allowing results to be sorted or aggregated across all three risk levels.

Figure 23:
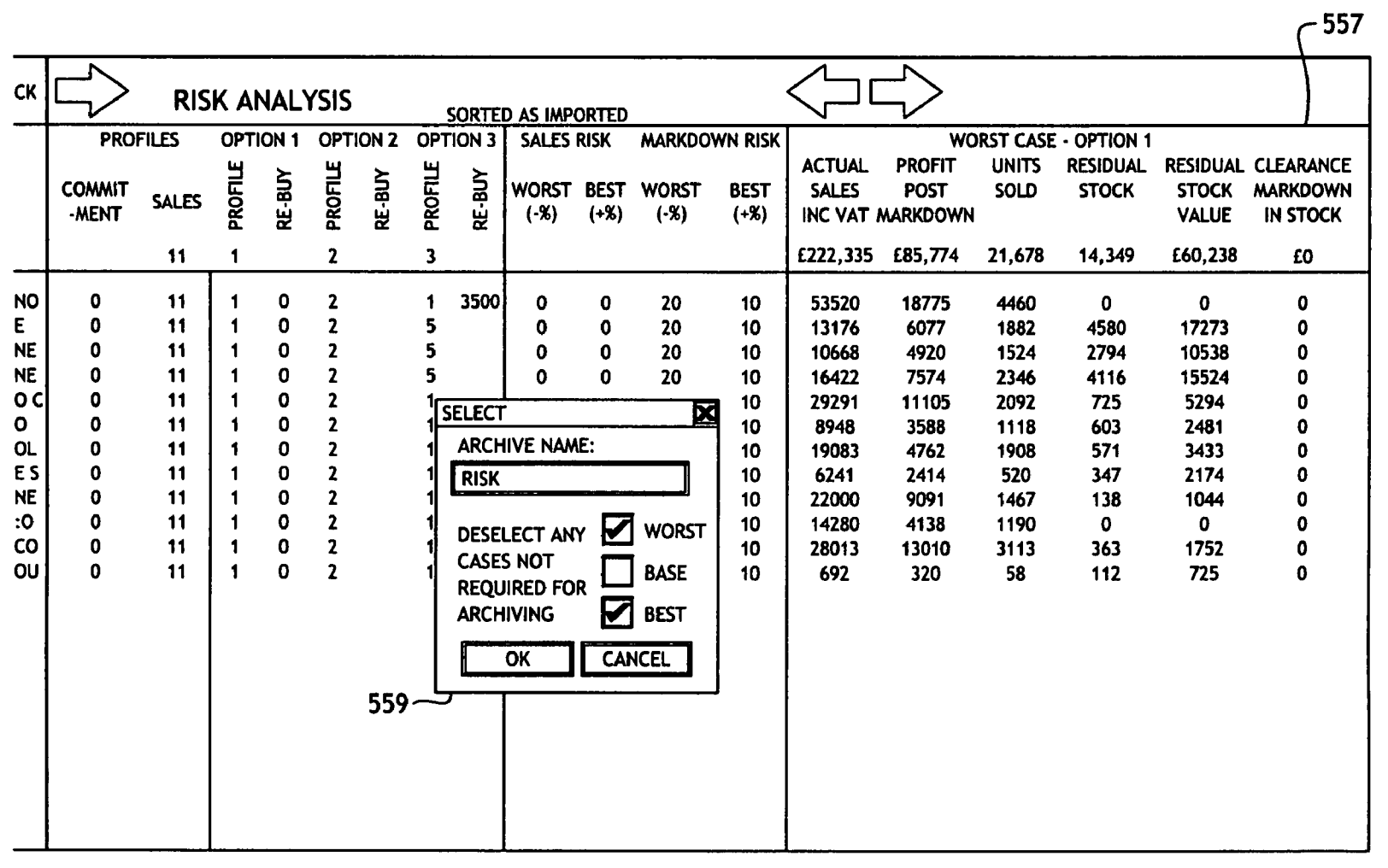
Figure 25:
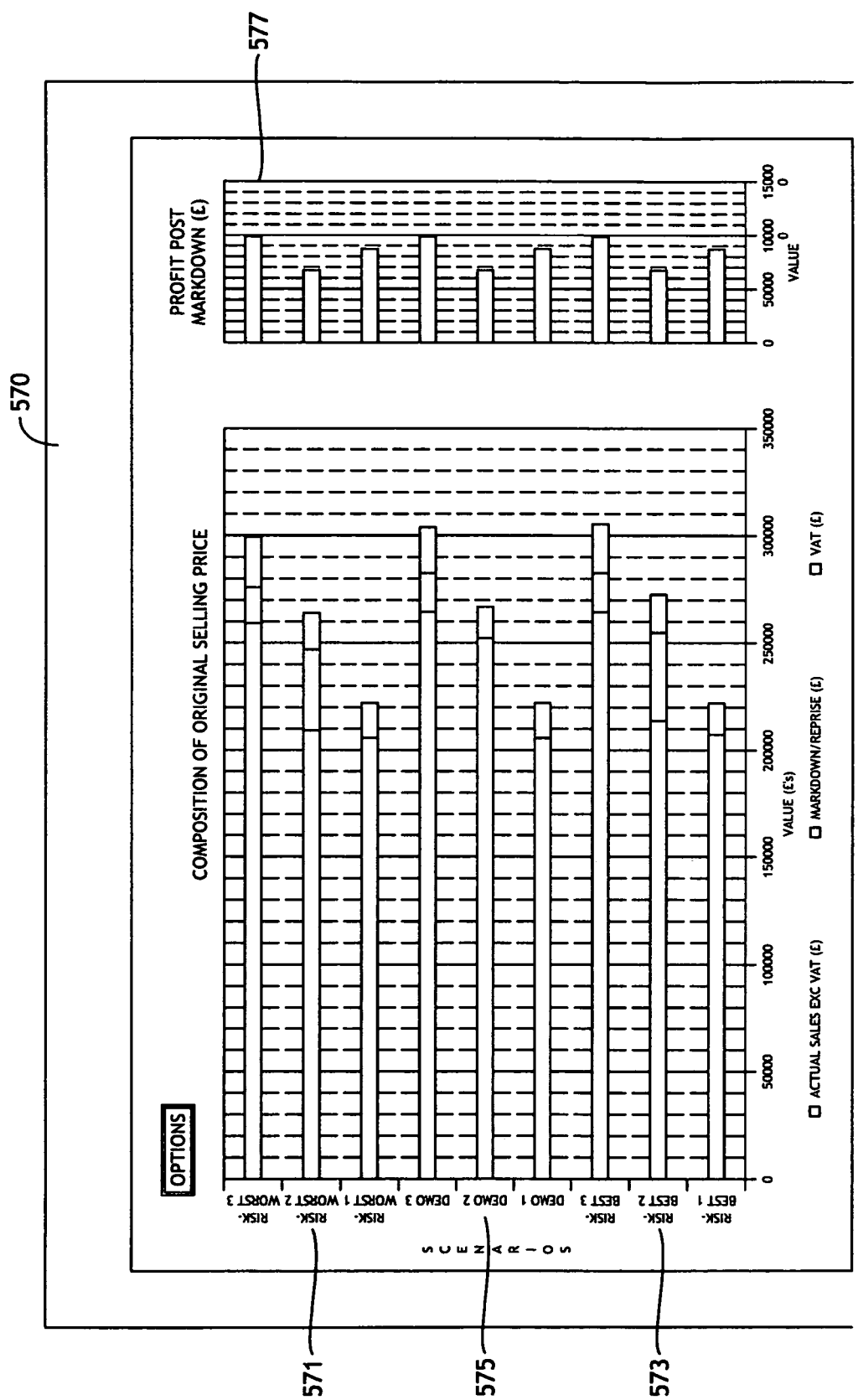
FIG. 25 is a bar graph derived from the archived data of FIG. 24.

The archiving functionality of the Risk Analysis screen 550 allows the result of this analysis to be clearly summarized and plotted, as shown in FIG. 23. For example, Worst Case (Option 1) Results 557 can be placed into a Risk-Worst column 561 in an Archive Table 560, shown in FIG. 24. In the example provided, the profit case of the preferred option appears to be robust against a variation in promotional sales effect, but the Risk Analysis function model demonstrates that residual stock levels are more sensitive to fluctuations in sales. In a similar fashion, a Risk-Best column 563 and a Demo column 565 are populated with data from the above-described analyses. These results can be plotted onto a Sales Chart 570, shown in FIG. 25, as a Risk-Worst set 571 of bar graphs, a Risk-Best set 573 of bar graphs, and a Demo set 575 of bar graphs. A second Sales chart 577 includes Profit Post Markdown data, which parameters can be changed via the Select Parameter box 539, in FIG. 20.

Figure 26:
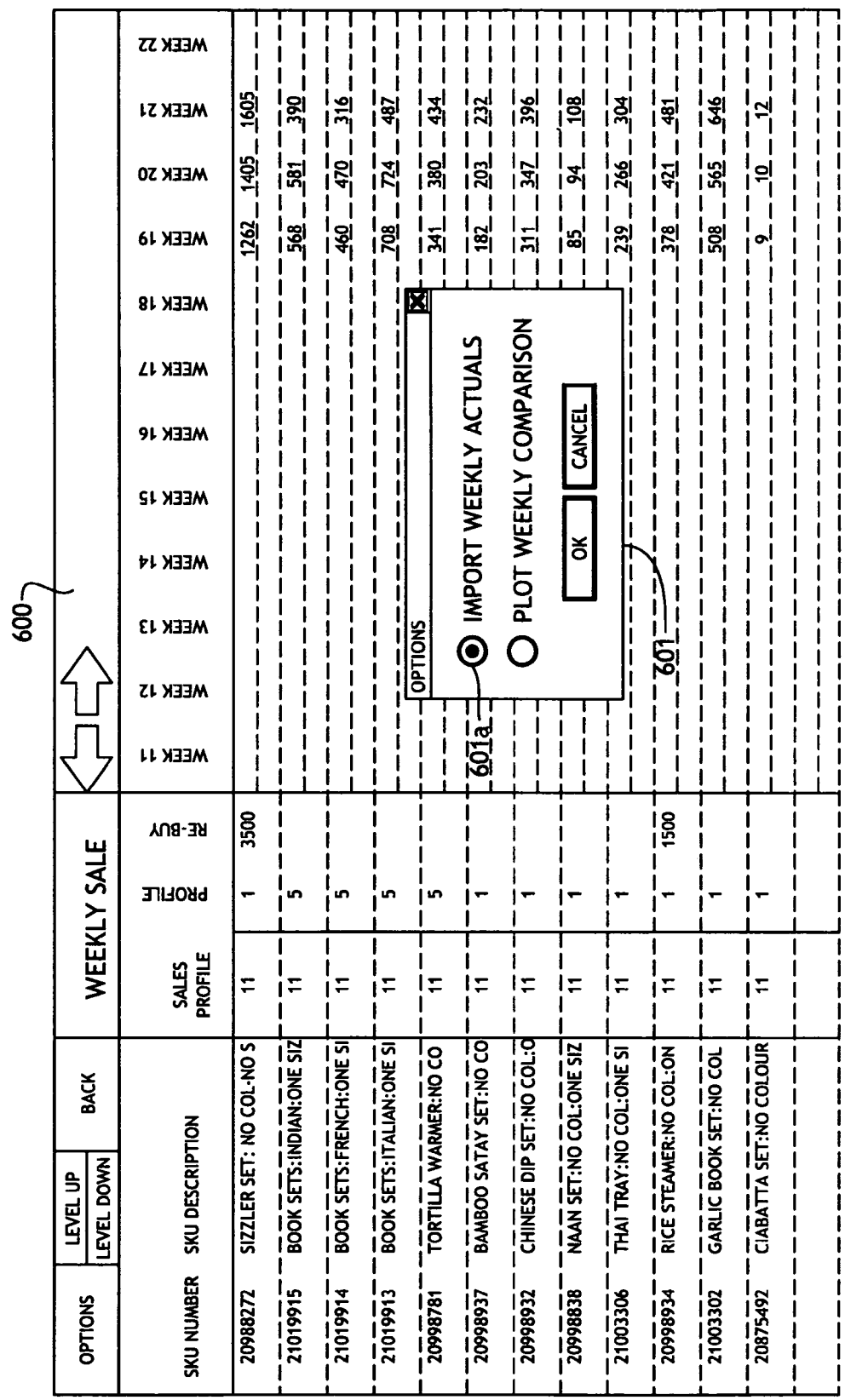
FIG. 26 shows the sales data chart of FIG. 16 including an options box with an import weekly actuals selection.
Figure 27:
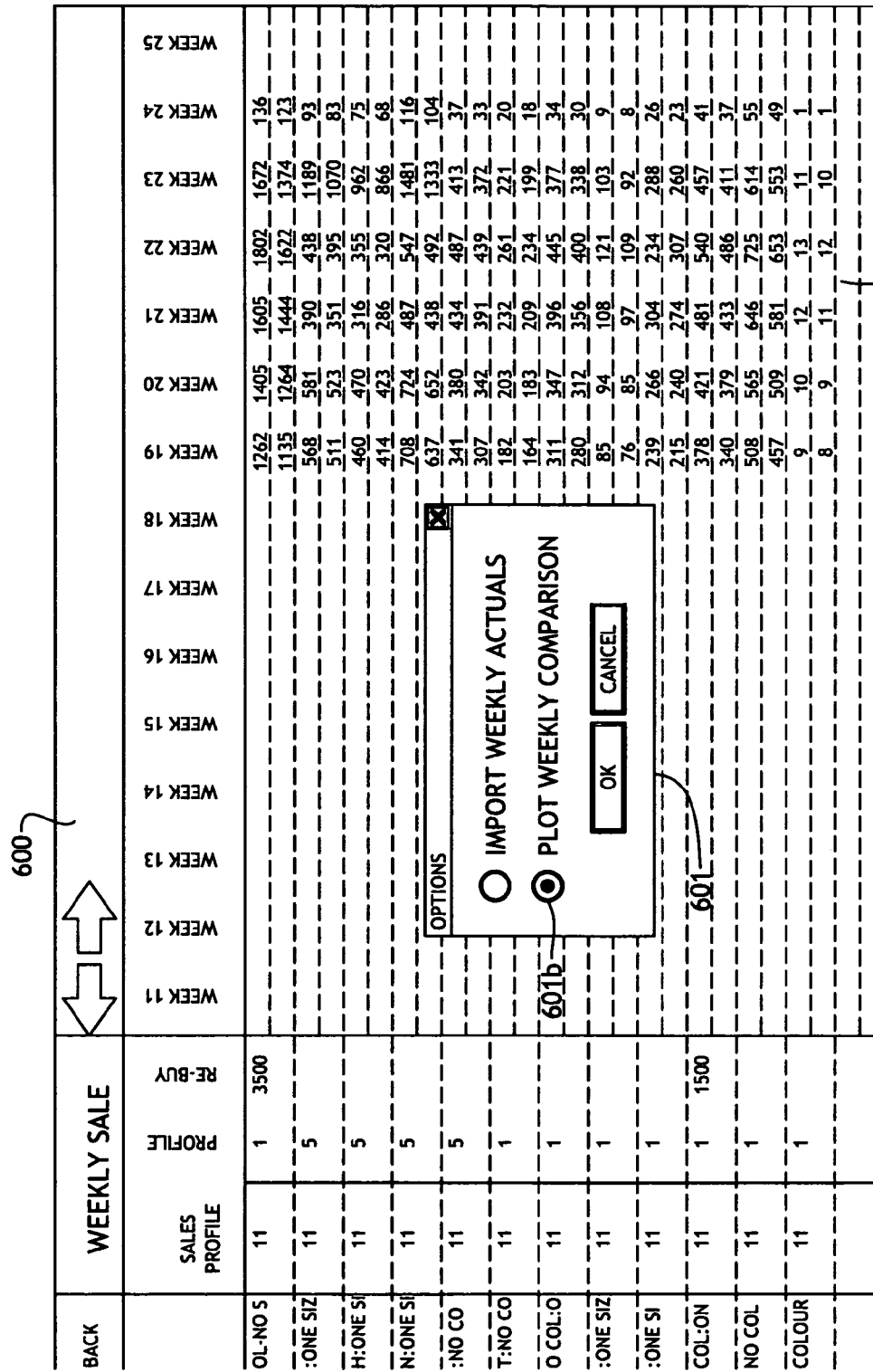
FIG. 27 shows the sales data chart of FIG. 16 including an options box with a plot weekly comparison selection.
Figure 28:
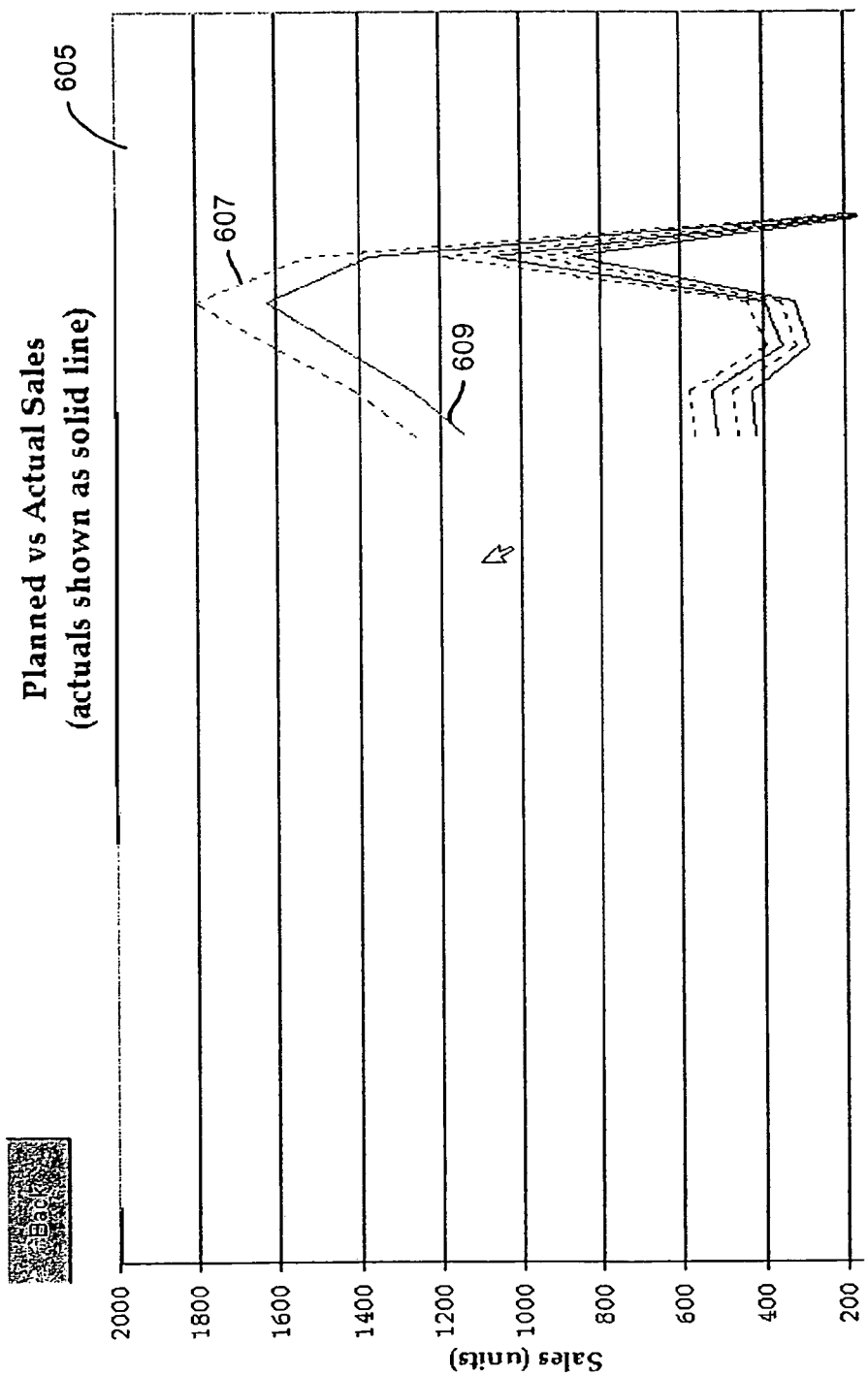
FIG. 28 is a plot of actual and planned sales curves.

A Forecast vs. Actual analysis tool, used in conjunction with a Weekly Sale screen 600, allows the user to compare a period of Actual Sales with a result generated by the analysis tool 300 at the start of the comparison period as a forecast. The Forecast vs. Actual analysis tool is accessed via an Options box 601, shown in FIG. 26. An Import Weekly Actuals selection 601a is made to import Weekly Sale data to a Comparison Period section 603 of the Weekly Sale screen 600, shown in FIG. 27. A Plot Weekly Comparison selection 601b is then made to produce a Planned vs. Actual Sales graph 605, shown in FIG. 28, which includes a Planned Sales curve 607 and an Actual Sales curve 609. The user can check the accuracy of sales profile definition, or the measurement of sales uplift generated by markdown strategies by means of the Planned vs. Actual Sales graph 605. The comparison between planned and actual sales can then be displayed or plotted at any level of the SKU hierarchy.

Figure 29:
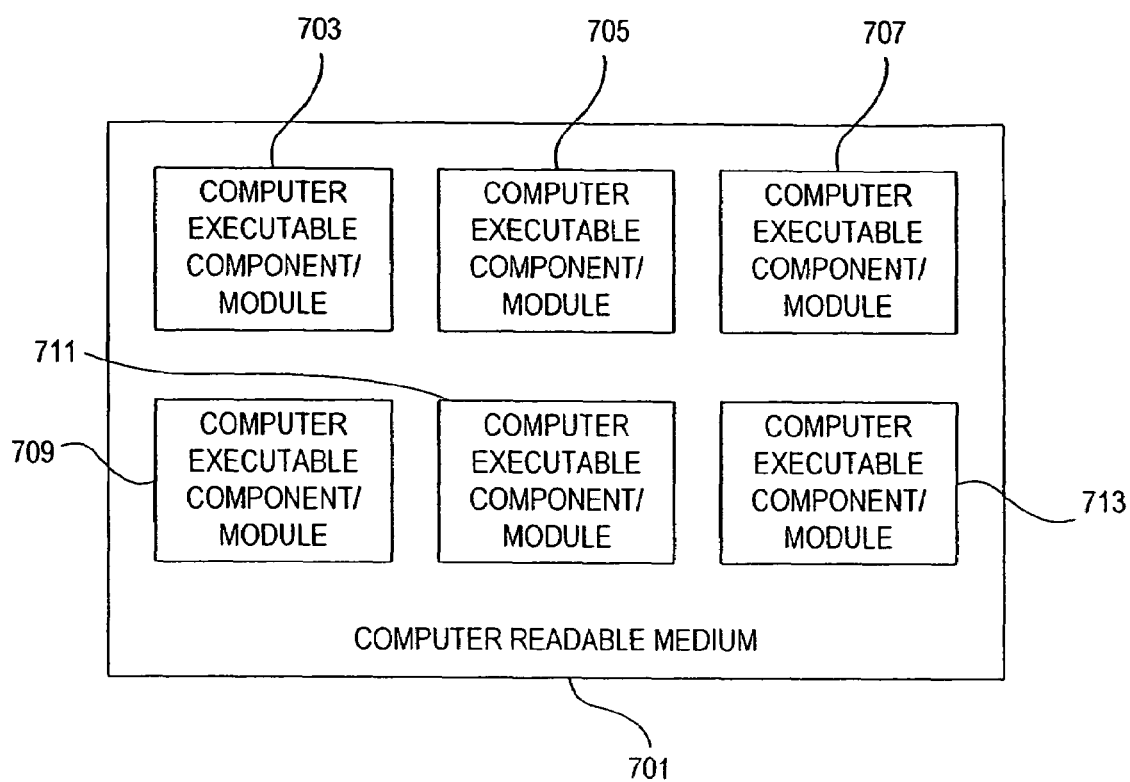
FIG. 29 illustrates a block diagram of a computer readable medium in accordance with an embodiment of the invention.

The inventive method may be embodied as computer readable instructions stored on a computer readable medium such as a floppy disk 25, hard disk 21, or system memory 13. FIG. 29 illustrates a block diagram of a computer readable medium 701 that may be used in accordance with one or more of the above embodiments. The computer readable medium 701 stores computer executable components, or software modules, 703-713. More or fewer software modules may alternatively be used. Each component may be an executable program, a data link library, a configuration file, a database, a graphical image, a binary data file, a text data file, an object file, a source code file, or the like. When processor 11 executes one or more of the software modules, the software modules interact to cause the computer system 10 to perform according to the teachings of the present invention.

While the invention has been described with reference to a preferred embodiment, it will be understood by those skilled in the relevant art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for analyzing product sales strategies using archived sales data, said method comprising the steps of:
   importing a sales profile;
   defining an analysis period;
   formatting at least a part of the archived sales data into one or more database files;
   verifying the integrity of the one or more database files based on validating the archived sales data, including uploading an original selling price for an item of the archived sales data that contains a value of zero and uploading a net cost price for an item of the archived sales data that contains a value of zero;
   calculating an adjusted weekly sale value based on said sales profile, said analysis period, and at least one of the one or more database files;
   calculating an uplifted sale value based on a selected uplift percentage and a base sale parameter, wherein the base sale parameter corresponds to projected sales of the analysis period and is based on a relationship having the form:

$$BaseSale(Analysis\_Period) = \frac{Sales\_Imported\_Period}{Profile\_Value\_Imported\_Period} \cdot Profile\_Value\_Analysis\_Period,$$

wherein a sales of an imported period corresponds to an actual sales of a specified period, a first profile value for the imported period corresponds to a first predicted sales for the specified period according to the sales profile, and a second profile value for the analysis period corresponds to a second predicted sales for the analysis period according to the sales profile; and
   calculating a profit based on said uplifted sale value and said adjusted weekly sale value.

2. The method of claim 1 further comprising the step of performing a risk analysis.

3. The method of claim 1 further comprising the step of archiving said adjusted weekly sale value.

4. The method of claim 2 wherein said step of performing a risk analysis comprises a step of performing a best case analysis.

5. The method of claim 2 wherein said step of performing a risk analysis comprises a step of performing a worst case analysis.

6. The method of claim 1 wherein at least one of said one or more database files comprises a spreadsheet.

7. The method of claim 1 wherein at least one of said one or more database files comprises a hierarchy file listing products identified by product number.

8. The method of claim 7 wherein said step of formatting at least a part of the archived sales data into one or more database files comprises the steps of:
   entering a class number and a class description;
   entering a subclass number and a subclass description;
   entering a style number and a style description;
   entering an option number and an option description; and
   entering a product identifier number and an identifier number description.

9. The method of claim 1 wherein at least one of said one or more database files comprises an actuals file listing empirical figures for product sales.

10. The method of claim 9 wherein said step of formatting at least a part of the archived sales data into one or more database files comprises the steps of:
    entering a week and a product identifier number;
    entering pricing data;
    entering stock on hand; and
    entering commitment and sales units.

11. The method of claim 10 further comprising the step of entering a tax rate.

12. The method of claim 1 wherein at least one of said one or more database files comprises a relational database.

13. The method of claim 1 wherein at least one of said one or more spreadsheet files comprises a spreadsheet database.

14. The method of claim 1 wherein said step of validating the archived sales data comprises the step of checking for new products.

15. The method of claim 1 wherein said step of validating the archived sales data comprises the step of checking file entries.

16. The method of claim 1 wherein said step of validating the archived sales data comprises the step of checking for new sales data.

17. A computer readable medium storing computer readable instructions that, when executed by one or more processors, cause one or more computers to perform the steps of:
    importing a sales profile;
    defining an analysis period;
    formatting at least a part of the archived sales data into one or more database files;
    verifying the integrity of the one or more database files based on validating the archived sales data, including uploading an original selling price for an item of the archived sales data that contains a value of zero and uploading a net cost price for an item of the archived sales data that contains a value of zero;
    calculating an adjusted weekly sale value based on said sales profile, said analysis period, and at least one of the one or more database files;
    calculating an uplifted sale value based on a selected uplift percentage and a base sale parameter, wherein the base sale parameter corresponds to projected sales of the analysis period and is based on a relationship having the form:

$$BaseSale(Analysis\_Period) = \frac{Sales\_Imported\_Period}{Profile\_Value\_Imported\_Period} \cdot Profile\_Value\_Analysis\_Period,$$

wherein a sales of an imported period corresponds to an actual sales of a specified period, a first profile value for the imported period corresponds to a first predicted sales for the specified period according to the sales profile, and a second profile value for the analysis period corresponds to a second predicted sales for the analysis period according to the sales profile; and calculating a profit based on said uplifted sale value and said adjusted weekly sale value.

18. A data processing system, comprising:
a processor;
memory storing computer readable instructions that, when executed by the processor, cause the data processing system to perform the steps of:
importing a sales profile;
defining an analysis period;
formatting at least a part of archived sales data into one or more database files;
verifying the integrity of the one or more database files based on validating the archived sales data, including uploading an original selling price for an item of the archived sales data that contains a value of zero and uploading a net cost price for an item of the archived sales data that contains a value of zero;
calculating an adjusted weekly sale value based on said sales profile, said analysis period, and at least one of the one or more database files;
calculating an uplifted sale value based on a selected uplift percentage and a base sale parameter, wherein the base sale parameter corresponds to projected sales of the analysis period and is based on a relationship having the form:

$$BaseSale(\text{Analysis\_Period}) = \frac{\text{Sales\_Imported\_Period}}{\text{Profile\_Value\_Imported\_Period}} \cdot \text{Profile\_Value\_Analysis\_Period},$$

wherein a sales of an imported period corresponds to an actual sales of a specified period, a first profile value for the imported period corresponds to a first predicted sales for the specified period according to the sales profile, and a second profile value for the analysis period corresponds to a second predicted sales for the analysis period according to the sales profile; and calculating a profit based on said uplifted sale value and said adjusted weekly sale value.

* * * * *